United States Patent
Kikuta et al.

(10) Patent No.: US 12,524,796 B2
(45) Date of Patent: Jan. 13, 2026

(54) INFORMATION PROCESSING APPARATUS, INFORMATION PROCESSING METHOD, AND NON-TRANSITORY COMPUTER READABLE MEDIUM

(71) Applicant: Rakuten Group, Inc., Tokyo (JP)

(72) Inventors: Daisuke Kikuta, Tokyo (JP); Md Mostafizur Rahman, Tokyo (JP); Satyen Abrol, Tokyo (JP); Yu Hirate, Tokyo (JP); Pablo Loyola, Tokyo (JP); Takuma Ebisu, Tokyo (JP); Manoj Kondapaka, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 284 days.

(21) Appl. No.: 18/355,027

(22) Filed: Jul. 19, 2023

(65) Prior Publication Data
US 2024/0104629 A1 Mar. 28, 2024

(30) Foreign Application Priority Data
Sep. 27, 2022 (JP) .................. 2022-153721

(51) Int. Cl.
G06Q 30/00 (2023.01)
G06Q 30/0204 (2023.01)
G06Q 30/0601 (2023.01)

(52) U.S. Cl.
CPC ..... *G06Q 30/0631* (2013.01); *G06Q 30/0205* (2013.01)

(58) Field of Classification Search
CPC .............................................. G06Q 30/06–08
See application file for complete search history.

(56) References Cited

U.S. PATENT DOCUMENTS

2014/0040372 A1* 2/2014 Kamimaeda ............ H04L 67/00
 709/204
2019/0205964 A1* 7/2019 Onoro Rubio ......... G06N 3/084
(Continued)

FOREIGN PATENT DOCUMENTS

JP 2019-125364 A 7/2019

OTHER PUBLICATIONS

Fumiyo Ito, et al., "A Study on Analysis Model of Customers' Purchasing Behavior Based on Knowledge Graph Attention Network", Journal of Information Processing Society, vol. 63, No. 1, Jan. 2022, pp. 205-217.

(Continued)

*Primary Examiner* — Ethan D Civan
(74) *Attorney, Agent, or Firm* — Sughrue Mion, PLLC

(57) ABSTRACT

An information processing apparatus acquires user features indicating features for each of a plurality of users and item features indicating features for each of a plurality of items, acquires time-series information indicating time-series interactions between the plurality of users and the plurality of items, constructs, based on the user features, the item features, and the time-series information, a graph including a plurality of user nodes representing the plurality of users, a plurality of item nodes representing the plurality of items, and links indicating interaction relationships in the plurality of user nodes and the plurality of item nodes, and extracts, from the graph, a node representation in the graph for any node among the plurality of user nodes and the plurality of item nodes.

13 Claims, 17 Drawing Sheets

(56) References Cited

U.S. PATENT DOCUMENTS

2023/0316308 A1* 10/2023 Hirate ................ G06Q 30/0269
                                                                705/7.34
2024/0029135 A1*  1/2024 Katz .................. G06Q 30/0631

OTHER PUBLICATIONS

Communication dated Sep. 10, 2024 issued by the Japanese Patent Office in application No. 2022-153721.

* cited by examiner

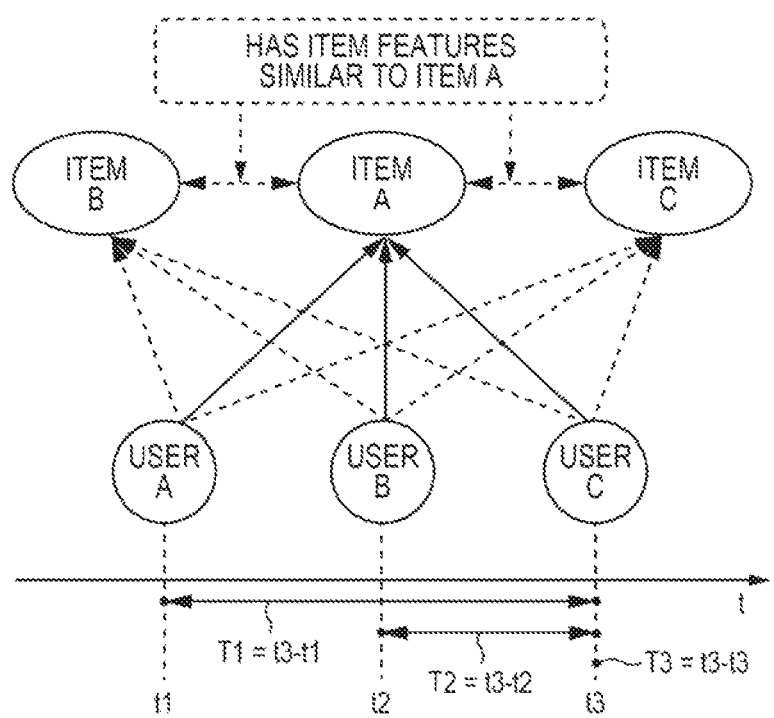

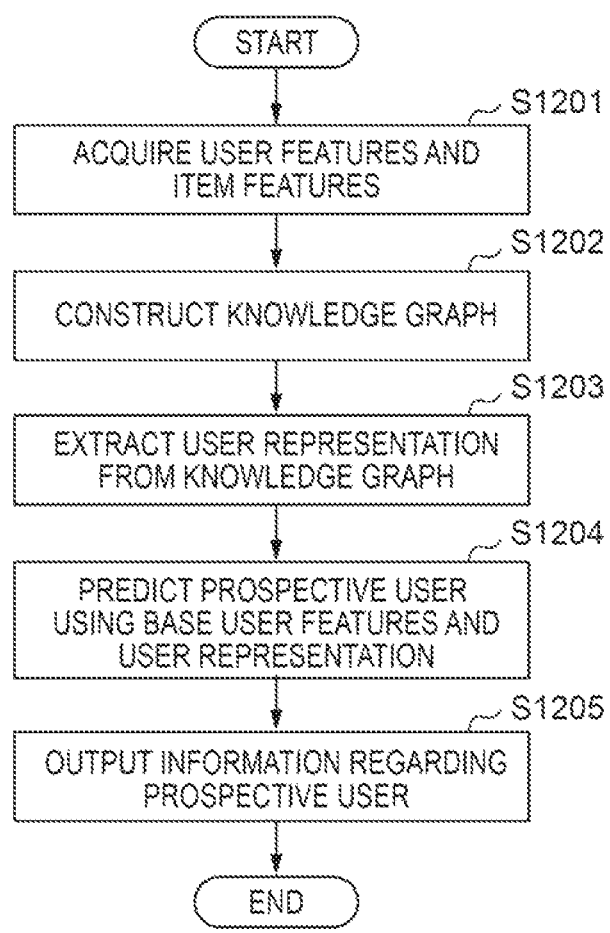

INFORMATION PROCESSING APPARATUS, INFORMATION PROCESSING METHOD, AND NON-TRANSITORY COMPUTER READABLE MEDIUM

TECHNICAL FIELD

The present invention relates to an information processing apparatus, an information processing method, and a non-transitory computer readable medium.

BACKGROUND ART

Recently, customer behavior analysis using graph form networks (graph networks) such as knowledge graphs has been attracting attention. For example, JP 2019-125364 A discloses collecting a data set including a plurality of entities and attributes of the plurality of entities, generating relationships among the entities, storing the entities, the attributes, and the relationships in a knowledge graph, and generating recommendations for a user based on the knowledge graph.

JP 2019-125364A is an example of related art.

SUMMARY OF THE INVENTION

In the knowledge graph disclosed in JP 2019-125364 A, both users and items such as products are included in the entities. On the other hand, a relationship between a user and an item may change over time. For example, if a user purchased a product A six months ago and a product B a few days ago, it can be said that the relationship between the user and the product B is stronger than the relationship between the user and the product A at this time. By reflecting such time-series relationships into the knowledge graph, the accuracy of user behavior analysis will be further improved.

The present invention has been made in view of the above problem, and an object thereof is to provide a technique for constructing a knowledge graph that reflects time-series relationships.

In order to solve the above problem, one aspect of an information processing apparatus according to the present invention includes: a feature acquisition unit configured to acquire user features indicating features for each of a plurality of users and item features indicating features for each of a plurality of items; a time-series information acquisition unit configured to acquire time-series information indicating time-series interactions between the plurality of users and the plurality of items; a construction unit configured to construct, based on the user features, the item features, and the time-series information, a graph including a plurality of user nodes representing the plurality of users, a plurality of item nodes representing the plurality of items, and links indicating interaction relationships in the plurality of user nodes and the plurality of item nodes; and an extraction unit configured to extract, from the graph, a node representation in the graph for any node among the plurality of user nodes and the plurality of item nodes.

In order to solve the above problem, one aspect of an information processing method according to the present invention includes: acquiring user features indicating features for each of a plurality of users and item features indicating features for each of a plurality of items; acquiring time-series information indicating time-series interactions between the plurality of users and the plurality of items; constructing, based on the user features, the item features, and the time-series information, a graph including a plurality of user nodes representing the plurality of users, a plurality of item nodes representing the plurality of items, and links indicating interaction relationships in the plurality of user nodes and the plurality of item nodes; and extracting, from the graph, a node representation in the graph for any node among the plurality of user nodes and the plurality of item nodes.

In order to solve the above problem, one aspect of an information processing program according to the present invention is an information processing program for causing a computer to execute information processing, the program includes: feature acquisition processing for acquiring user features indicating features for each of a plurality of users and item features indicating features for each of a plurality of items; time-series information acquisition processing for acquiring time-series information indicating time-series interactions between the plurality of users and the plurality of items; construction processing for constructing, based on the user features, the item features, and the time-series information, a graph including a plurality of user nodes representing the plurality of users, a plurality of item nodes representing the plurality of items, and links indicating interaction relationships in the plurality of user nodes and the plurality of item nodes; and extraction processing for extracting, from the graph, a node representation in the graph for any node among the plurality of user nodes and the plurality of item nodes.

According to the present invention, it is possible to provide a technique for constructing a knowledge graph that reflects time-series relationships.

The objects, aspects, and effects of the present invention described above and the objects, aspects and effects of the present invention not described above can be understood by a person skilled in the art based on the following modes for carrying out the invention by referring to the accompanying drawings and the description of the claims.

BRIEF DESCRIPTION OF THE DRAWINGS

FIG. 8E shows another example of a conceptual diagram of a user-item time-series relationship in implicit links.

FIG. 12 is a flowchart of processing to be executed by the information processing apparatus 10.

EMBODIMENTS OF THE INVENTION

Hereinafter, an embodiment for implementing the present invention will be described in detail with reference to the accompanying drawings. Constituent elements disclosed hereinafter that have the same function as each other are denoted by identical reference signs, and description thereof is omitted. Note that the embodiments disclosed hereinafter are examples serving as a means of realizing the present invention, the embodiments are to be amended or modified as appropriate according to the configuration of the apparatus to which the present invention is applied and various conditions, and the present invention is not limited to the following embodiments. Also, not all combinations of features described in the present embodiments are essential for the solving means of the present invention.

Configuration of Information Processing System

Figure 1:
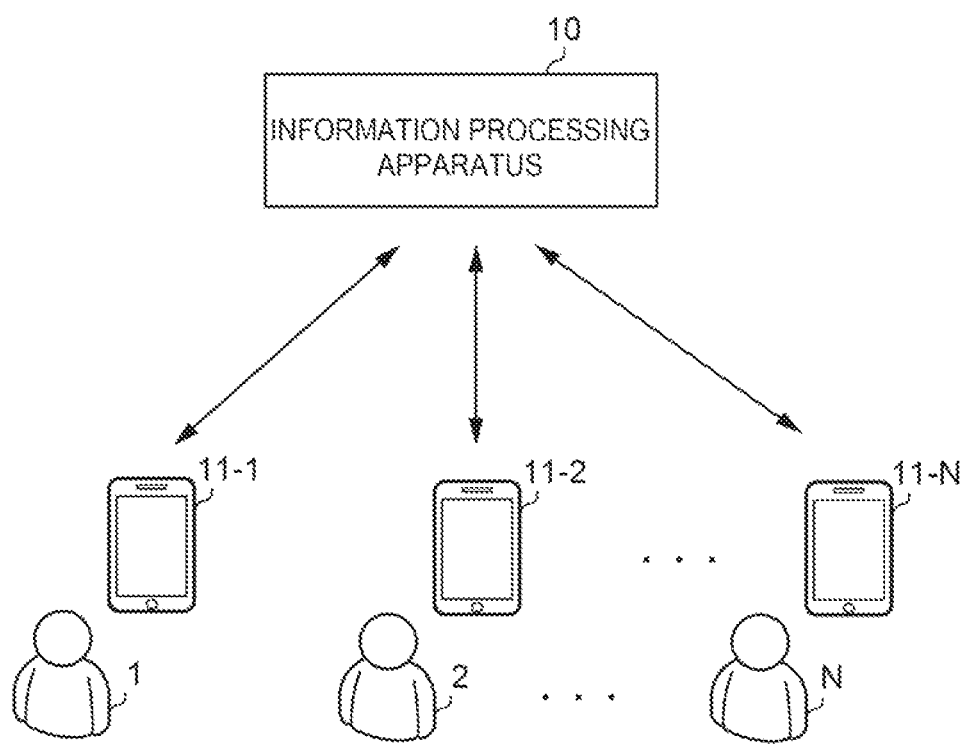
FIG. 1 shows an exemplary configuration of an information processing system.

FIG. 1 shows an exemplary configuration of an information processing system according to the present embodiment. In one example, as shown in FIG. 1, the present information processing system includes an information processing apparatus 10, and a plurality of user apparatuses 11-1 to 11-N (N>1) used by any plurality of users 1 to N. Note that in the following description, the user apparatuses 11-1 to 11-N can be referred to collectively as user apparatuses 11 unless otherwise specified. Also, in the following description, the terms "user apparatus" and "user" can be used synonymously.

The user apparatus 11 is, for example, an apparatus such as a smartphone or a tablet, and can communicate with the information processing apparatus 10 via a public network such as LTE (Long Term Evolution) or a wireless communication network such as a wireless LAN (Local Area Network). The user apparatus 11 has a display unit (display screen) such as a liquid crystal display, and each user can perform various operations through a GUI (Graphic User Interface) installed in the liquid crystal display. The operations include various operations performed with a finger or a stylus on content such as images displayed on the screen, such as a tap operation, a slide operation, or a scroll operation.

Note that the user apparatus 11 is not limited to an apparatus of the form shown in FIG. 1, and may also be an apparatus such as a desktop PC (Personal Computer) or a laptop PC. In this case, the operations performed by each user can be performed using an input apparatus such as a mouse or a keyboard. Also, the user apparatus 11 may include a display screen separately.

The user apparatus 11 can use a service by logging into a web service (Internet-related service) provided via the information processing apparatus 10, from the information processing apparatus 10 or another apparatus (not shown). The web service can include an online mall, an online supermarket, or a service relating to communication, finance, real estate, sports, or travel, which are provided via the Internet. The user apparatus 11 can transmit information relating to the user of the user apparatus 11 to the information processing apparatus 10 by using such a web service.

For example, the user apparatus 11 can transmit information regarding features relating to the user apparatus or the user, such as the IP (Internet Protocol) address of the user apparatus 11, the address of the user, or the name of the user, to the information processing apparatus 10.

Also, the user apparatus 11 can perform positioning calculation based on signals or the like received from GPS (Global Positioning System) satellites (not shown), generate information obtained through the calculation as position information of the user apparatus 11, and transmit the generated information to the information processing apparatus 10.

The information processing apparatus 10 acquires various types of information from the user apparatus 11, and creates a knowledge graph based on the acquired information. The knowledge graph is a directed graph that represents knowledge in the real world with a factual structure. In the present embodiment, the knowledge graph is constituted by a user relationship (interaction) graph, an item relationship graph, and a user-item relationship graph. Also, the information processing apparatus 10 extracts a user representation of any user (a feature vector, embedded representation, or vector representation of the user in a directed graph such as a knowledge graph) from the knowledge graph.

Functional Configuration of Information Processing Apparatus 10

The information processing apparatus 10 according to the present embodiment first acquires various user features from the user apparatuses 11-1 to 11-N, and acquires features regarding items from a predetermined database. In the present embodiment, the items may be tangible or intangible things that can be provided in various services. For example, there are items such as a bank account, a financial product such as stocks, an investment trust, or an insurance product, cryptocurrency, and smartphone payment application, for a finance (fintech) service. Also, there are items such as moving image contents such as movies and animations and still image contents such as photographs, illustrations, and text, for a digital content service. Also, there are items such as intangible or tangible goods that are handled in net shopping, for an e-commerce service. Also, there are items such as information regarding hotels, package tours, and transportation facilities and reservation, for a travel service. Also, there are items such as a mobile apparatus, a public network/Internet connection, and a communication usage charge, for a mobile service. Also, there are items such as offline and online advertisement products, direct mails, and advertisements through broadcasting and the Internet, for an advertisement and media service. Also, there are items such as credit card payment and point trade, for a card service. Also, there are items such as events such as sport events and concerts and products sold in events, for a sport and culture service.

The information processing apparatus 10 creates a knowledge graph from the acquired user features and item features, and extracts a user representation for any user from the knowledge graph. The knowledge graph is constituted by a user relationship graph, an item relationship graph, and a user-item relationship graph, which will be described later. Moreover, the information processing apparatus 10 performs a predetermined task related to a user behavior analysis using the user representation. For example, the information processing apparatus 10 performs a task such as user segmentation (extraction of a group of users with similar user features), item purchase probability prediction, or similar user prediction through items. In the present embodiment, an example will be described in which the information processing apparatus 10 predicts a prospective user having user features similar to those of a predetermined (given) seed user (target user), the prospective user being highly likely to purchase the same item as the seed user, for example.

Figure 2:
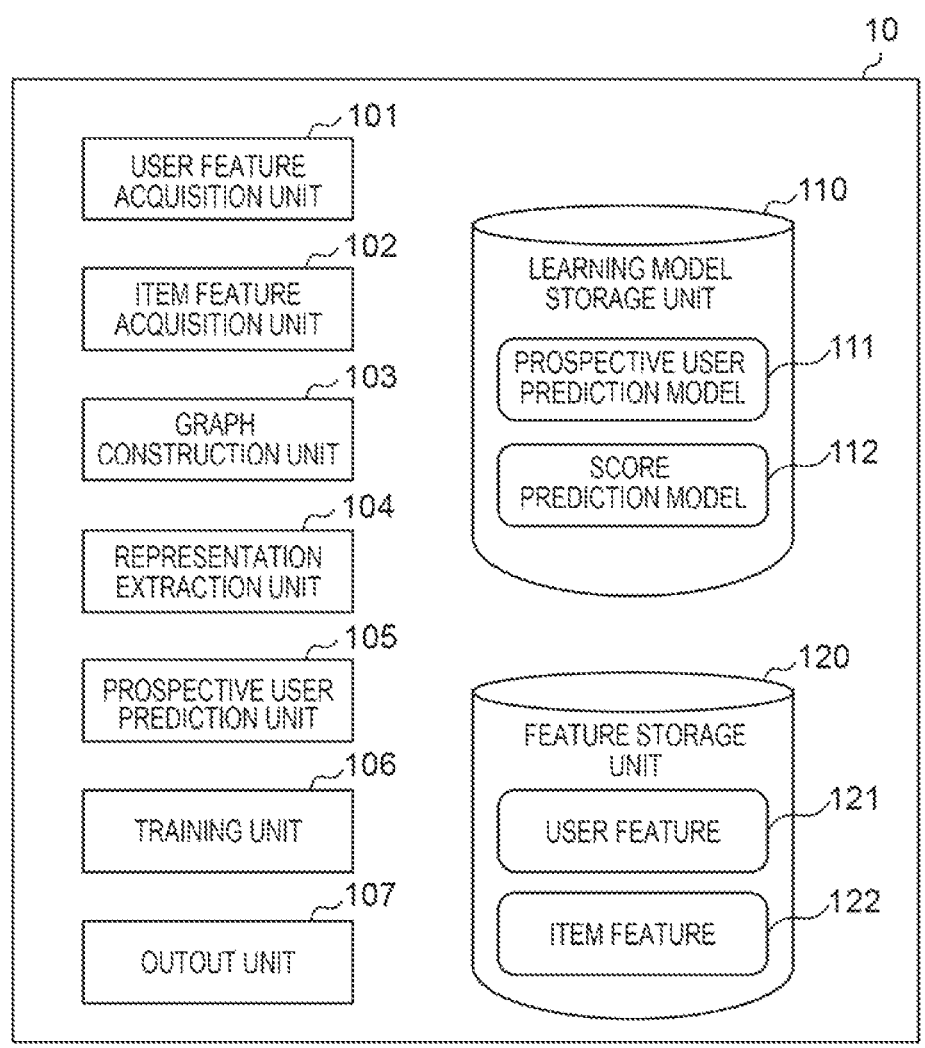
FIG. 2 shows an exemplary functional configuration of an information processing apparatus 10.

FIG. 2 shows an example of a functional configuration of the information processing apparatus 10 according to the present embodiment.

The information processing apparatus 10 shown in FIG. 2 includes a user feature acquisition unit 101, an item feature acquisition unit 102, a graph construction unit 103, a representation extraction unit 104, a prospective user prediction unit 105, a training unit 106, an output unit 107, a learning model storage unit 110, and a feature storage unit 120. The learning model storage unit 110 stores a prospective user prediction model 111 and a score prediction model 112. The various learning models will be described later. Also, the feature storage unit 120 is configured to store user features 121 and item features 122.

The user feature acquisition unit 101 acquires factual features (factual information) (hereinafter referred to as user features) about the user apparatuses or the users from each of the user apparatuses 11-1 to 11-N. The user features are features (information) based on facts actually or objectively acquired from the user apparatuses or the users. For example, the user feature acquisition unit 101 can directly acquire the user features from the user apparatuses 11. Also, the user feature acquisition unit 101 can acquire the user features as information registered with a predetermined web service by the users of the user apparatuses 11.

The user features include IP addresses of the user apparatuses, the addresses of the users or the names of the users, the numbers of credit cards possessed by the users, demographic information of the users (demographic user attributes such as sex, age, area of residence, occupation, and family composition), and the like. Also, the user features may include registration numbers and registration names used when using a predetermined web service. Also, the user features may include information relating to a call history, a delivery address other than the address of the user for a product at the time of using the predetermined web service, a use status during use of the predetermined web service, a use history (including a purchase history and a selling history), a search history, viewing history (including a click history), and points that can be accumulated through use of a service. Thus, the user features can include any information, including information relating to the user apparatus or the user, and information relating to use of a predetermined service through communication.

The user feature acquisition unit 101 stores the acquired user features in the feature storage unit 120 as the user features 121.

The item feature acquisition unit 102 acquires features (attributes) of an item from a predetermined database (not shown), based on registration information and a transaction history in various web services. The features of the item include information for identifying the item (hereinafter, item ID), information for identifying the genre (upper-level classification) of the item (hereinafter, genre ID), information for identifying the shop that sells the item (hereinafter, shop ID), and the like. An item feature can include transaction information (e.g., number of transactions) between an item ID and a genre ID and between an item ID and a shop ID according to the transaction history. The item feature acquisition unit 102 stores the acquired features of the item in the feature storage unit 120 as item features 122.

The graph construction unit 103 constructs a knowledge graph based on various features acquired from the user feature acquisition unit 101 and the item feature acquisition unit 102. The knowledge graph will be described later.

The representation extraction unit 104 extracts a user representation for any user from a knowledge graph constructed by the graph construction unit 103. The representation extraction unit 104 may also extract an item representation for any item from the knowledge graph. The processing for extracting the user representation (or, item representation) will be described later. Also, the representation extraction unit 104 may extract an embedded representation (vector representation) regarding any node in the constructed knowledge graph, as a shop representation or a genre representation, for example.

The prospective user prediction unit 105 predicts a user that is predicted to have the same user features as a given seed user and perform the same (similar) behavior as the seed user through a web service, as a prospective user (similar user). The seed user is at least one user that has purchased and/or used a given product or service through a web service, and/or that has positively evaluated the product or service through the web service. The seed user is at least one user selected from the user apparatuses 11-1 to 11-N and set. The seed user may be set by an operator through an input operation performed using an input unit (input unit 205 in FIG. 12), may be set in advance in the system, or may be set by any program stored in a storage unit (ROM 202 or RAM 203 in FIG. 11). In the present embodiment, the prospective user is predicted using a prospective user prediction model 111 that has been trained by the training unit 106. The processing for predicting the prospective user will be described later.

The training unit 106 trains the prospective user prediction model 111 and the score prediction model 112 and stores the trained prospective user prediction model 111 and the score prediction model 112 in the learning model storage unit 110. Processing for training each learning model will be described later.

The output unit 107 outputs a user representation extracted by the representation extraction unit 104 and information regarding a prospective user predicted by the prospective user prediction unit 105. The output can be any output processing, and may be output to an external apparatus via the communication I/F (the communication I/F 207 in FIG. 11), or may be display on a display unit (the display unit 206 in FIG. 11).

Procedure for Constructing Knowledge Graph

Figure 3:
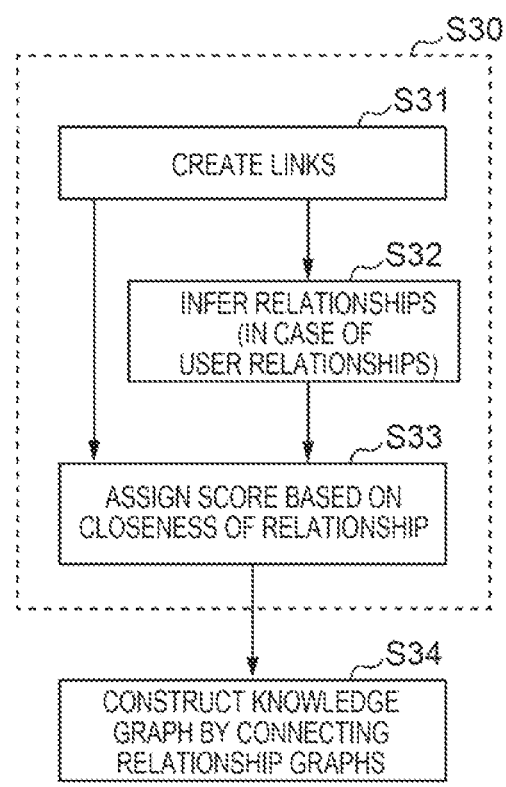
FIG. 3 shows a flowchart of a procedure for creating a knowledge graph.

Next, a procedure for creating a knowledge graph according to the present embodiment will be described. The knowledge graph is constituted by a user relationship graph, an item relationship graph, and a user-item relationship graph. FIG. 3 shows a flowchart of the procedure for constructing a knowledge graph that is executed by the graph construction unit 103 according to the present embodiment. First, procedures for creating the user relationship graph, the item relationship graph, and the user-item relationship graph (corresponding to the processing in step S30 in FIG. 3) will be described below.

(1) Procedure for Creating User Relationship Graph

A procedure for creating a user relationship graph will be described. Note that users A to E in the following description are users referred to for the description, and can be users of the user apparatuses 11. Also, the user relationship graph is constituted by connections of user nodes (nodes including identification information of users) circled in FIGS. 4A and 4B, and in the following description, the user nodes are simply referred to as users. Each step of the processing in step S30, with respect to the user relationship graph, in FIG. 3 will be described below.

Step S31: Link Creation

In step S31, the graph construction unit 103 predicts and creates links between a plurality of users.

Figure 4A:
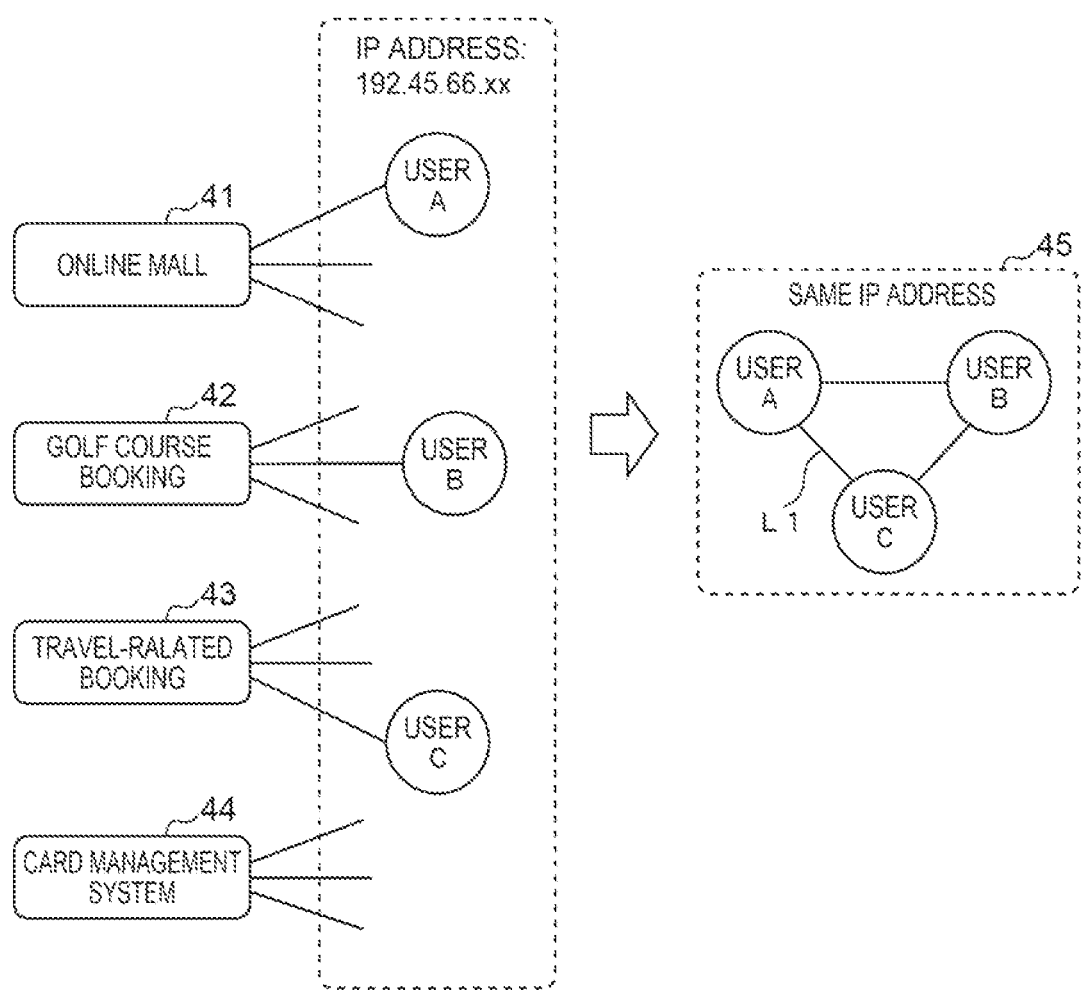
FIG. 4A is a diagram for describing explicit links.
Figure 4B:
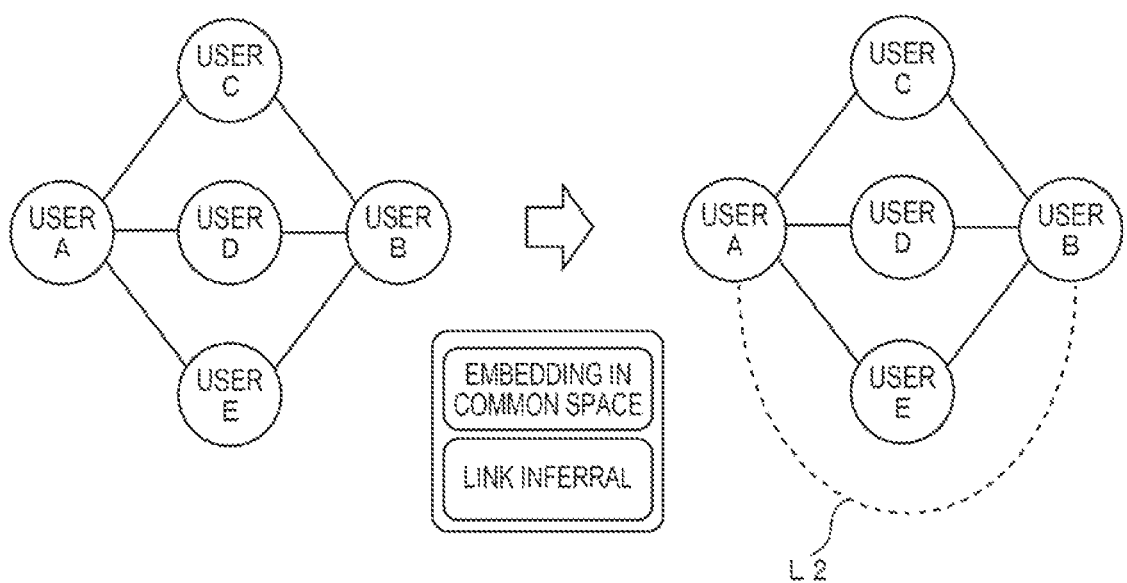
FIG. 4B is a diagram for describing implicit links.

The processing for creating links will be described with reference to FIGS. 4A and 4B. FIG. 4A is a diagram for illustrating an explicit link, and FIG. 4B is a diagram for illustrating an implicit link. An explicit link is a link created by explicit features held in common by two users (a user pair). An implicit link is a link created as an indirect relationship using explicit links that have already been created, although there is no clear explicit link held in common by the user pair. Thus, links between users are identified by explicit links and implicit links.

FIG. 4A shows an example in which explicit links are created using an IP address of user apparatuses of users as a common feature. FIG. 4A shows an example in which an online mall 41, a golf course reservation service 42, a travel-related reservation service 43, and a card management system 44 exist as web services available to users A to C. In FIG. 4A, four web services are shown, but the number of web services is not limited to a specific number.

The online mall 41 is a shopping mall that is available online (using the Internet). For example, the online mall 41 can provide a wide variety of products and services such as fashion, books, food, concert tickets, and real estate.

The golf course reservation service 42 is operated by a website that provides a service relating to a golf course online, and for example, can provide a search for golf courses, reservations, and lesson information.

The travel-related reservation service 43 is operated by a website that provides various travel services that are available online. The travel-related reservation service 43 can, for example, provide reservations for hotels and travel tours, reservations for airline tickets and rental cars, sightseeing information, information regarding hotels and surrounding areas of the hotels.

The card management system 44 is operated by a website that provides a service related to a credit card issued and managed by a predetermined card management company. The card management system 44 may also provide a service relating to at least one of the online mall 41, the golf course reservation service 42, and the travel-related reservation service 43.

In the example of FIG. 4A, the users A to C use the same IP address (=198.45.66.xx) to use the online mall 41, the golf course reservation service 42, and the travel-related reservation service 43. The information on the IP address can be acquired by the user feature acquisition unit 101.

In such a case, the graph construction unit 103 creates mutual explicit links between the users A to C (e.g., a link L1 between the user A and the user C) with the feature of having the same IP address, as shown in a link state 45. The explicit links are shown by solid lines.

In addition to the example shown in FIG. 4A, explicit links can be created using a feature of user addresses and a feature of credit card numbers used by users as a common feature.

FIG. 4B shows an example of creating an implicit link between users. In the example of FIG. 4B, the user C, the user D, and the user E are connected to the user A by explicit links, and the user C, the user D, and the user E are connected to the user B by explicit links. This kind of link feature (a feature indicating a relationship between links) is embedded in the common feature space, and a link obtained by inferring that a relationship is implicitly constructed between users (nodes) is created (established) as an implicit link. In the example of FIG. 4B, the user A and the user B are not connected by an explicit link, but an implicit link L2 shown by a broken line is created as a result of inferring that there is a relationship in the common feature space. Note that the graph construction unit 103 predicts and creates explicit links between users by performing learning (representation learning, relationship learning, embedding learning, knowledge graph embedding) of a user relationship graph constituted by nodes (users) connected by explicit links. At this time, the graph construction unit 103 may perform the learning based on a known embedding model or its extension, as appropriate.

Step S32: Inferring Relationships Between Links

Figure 5:
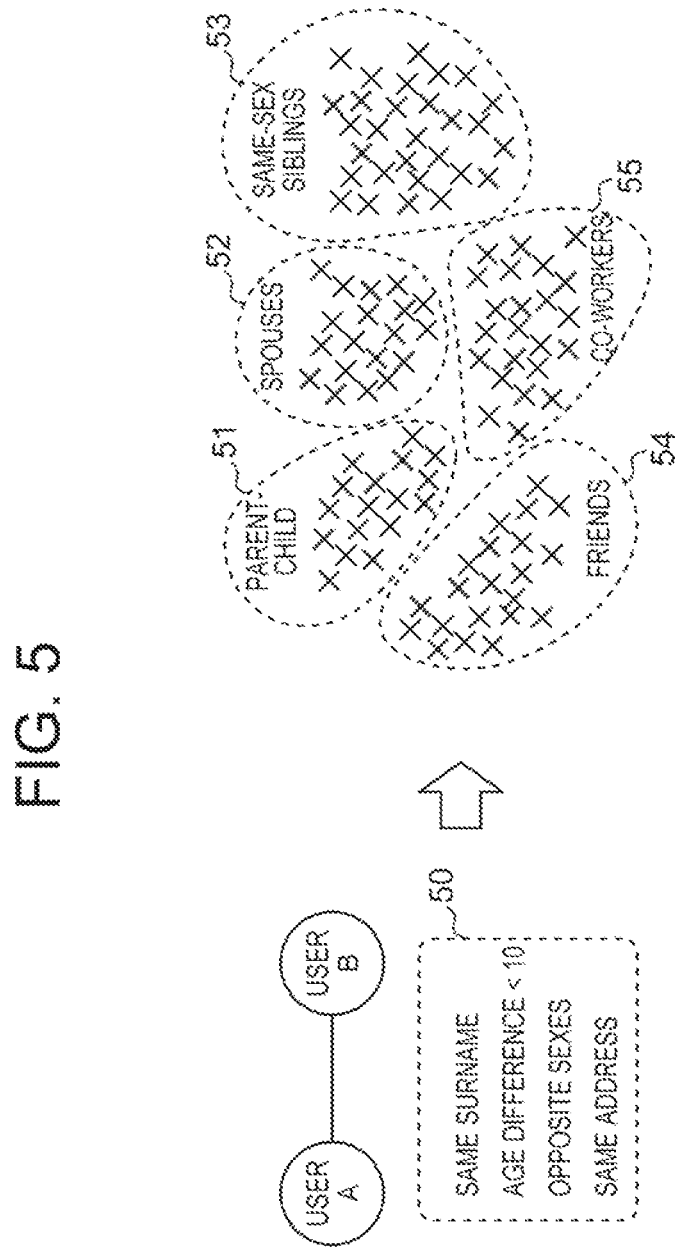
FIG. 5 is a diagram for describing processing for inferring a relationship between links.

In step S32, the graph construction unit 103 infers relationships between the links predicted and created in step S31. The processing for inferring relationships between links will be described with reference to FIG. 5. FIG. 5 is a diagram for illustrating processing for inferring relationships between links, and shows an example of inferring a relationship of a link between the user A and the user B who are connected by an explicit link.

The graph construction unit 103 treats the pair of users connected by the link created in step S31 as a data point and groups the pair (the data point) into a cluster representing a common type, using various types of information acquired by the user feature acquisition unit 101. The various types of information can be information such as an IP address, an address, a credit card, an age, a sex, or a friend. Also, each cluster can be a cluster having a relationship such as spouses, a parent and child, neighbors, people sharing the same household, co-workers, friends, siblings of the same sex, or siblings of different sexes. In the example of FIG. 5, a pair of users is indicated by an X mark, and a parent-child cluster 51, a spouse cluster 52, a same-sex sibling cluster 53, a friend cluster 54, and a co-worker cluster 55 are shown as clusters into which the pair can be grouped. Note that although five clusters are shown in FIG. 5, the number of clusters is not limited to a specific number.

For example, if the user A and the user B have (share) features 50 of having the same surname, having an age difference of 10 years or less, being of opposite sexes, and having the same address, the graph construction unit 103 can group the pair of the user A and the user B into the cluster (spouse cluster 52) indicating the relationship of husband and wife (spouses).

Step S33: Score Assignment Based on Closeness of Relationship

Figure 6A:
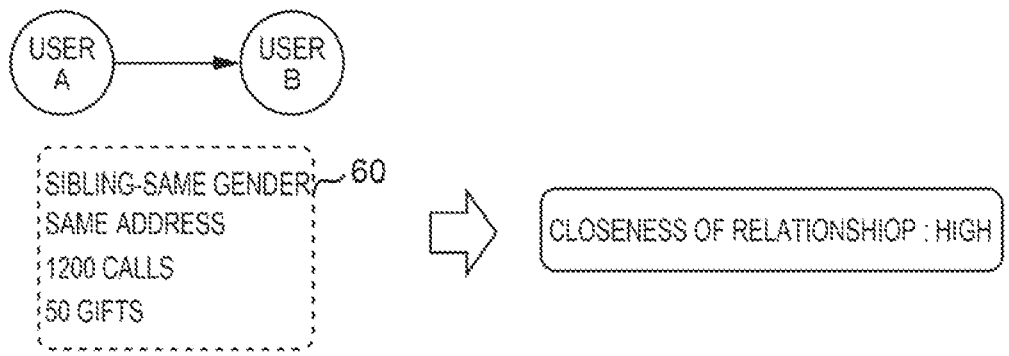
FIG. 6A shows a conceptual diagram of a score (closeness score) based on closeness of a relationship between a user pair.

In step S33, the graph construction unit 103 predicts a score based on the closeness of the relationship for the pair inferred in step S32, and assigns the score to the pair. In this embodiment, the score is a numeric value between 0 and 1, but there is no particular limitation on the numeric value that the score can take. FIG. 6A shows a conceptual diagram of a score based on the closeness of the relationship of a user pair (hereinafter referred to as a closeness score).

In the example of FIG. 6A, the closeness of the relationship of the pair of users changes depending on the features that the user A and the user B connected by the explicit link have (share). In the upper part of FIG. 6A, if the relationship between the user A and the user B has features 60 of being same-sex siblings, having the same address, having a call history of 1200 calls, and exchanging gifts 50 times, the closeness of the relationship of the pair of users (i.e., the closeness score) is higher. On the other hand, in the lower part of FIG. 6A, if the relationship between the user A and the user B has features 61 of being same-sex siblings, having different addresses, having a call history of 30 calls, and exchanging two gifts, the closeness of the relationship of the pair of users (i.e., the closeness score) is lower. In this manner, as in the example of FIG. 6A, even if the user A and the user B are same-sex siblings, the closeness of the relationship of the pair differs depending on other features shared by the pair of users. It is observed that pairs with a high closeness score have a close social distance to each other and have a high influence on each other. On the other hand, it is observed that pairs with a low closeness score have a far social distance from each other and do not have a close relationship.

Figure 6B:
FIG. 6B shows a schematic architecture of a score prediction model.

In the present embodiment, a score prediction model 112 is used to predict the closeness score for a user pair. Schematic architecture of the score prediction model 112 is shown in FIG. 6B. The score prediction model 112 is a learning model that receives features 63 of the user pair as input and predicts the closeness score 64 for the features 63.

The score prediction model 112 is, for example, a learning model that performs weak supervised learning, such as a learning model using a convolutional neural network (CNN). In the present embodiment, the score prediction model 112 is a learning model that is trained using closeness scores (0 to 1) assigned to a plurality of features for user pairs as training data, as shown in FIG. 6A. For example, in the training stage, combined data of a closeness score close to 1 set for the features 60 in FIG. 6A and a closeness score close to 0 set for the features 61 is used as training data. The training processing is performed by the training unit 106.

It should be noted that, in the present embodiment, although the closeness score for a user pair is predicted using the score prediction model 112, the graph construction unit 103 may also be configured to predict the score using another method.

Figure 6C:
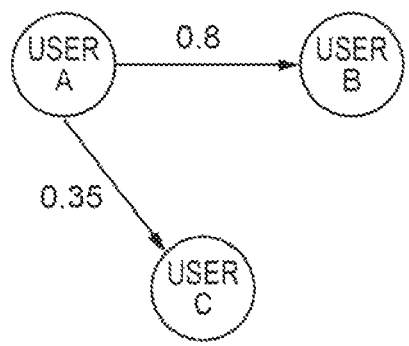
FIG. 6C shows a conceptual diagram of a user relationship graph.

Through the above processing, explicit links or implicit links are formed between a plurality of users, closeness scores are assigned for each link, and a user relationship graph is created. A conceptual diagram of the user relationship graph is shown in FIG. 6C. A closeness score predicted as described above is assigned to each user pair. Note that, in the present disclosure, a closeness score assigned to a link (explicit link or implicit link) is to be understood to be synonymously with a weighting to the link. For example, a high closeness score corresponds to a high weighting and a low closeness score corresponds to a low weighting.

(2) Procedure for Creating Item Relationship Graph

Next, a procedure for creating an item relationship graph will be described. Similarly to the procedure for creating the user relationship graph, the graph construction unit 103 creates an item relationship graph in accordance with the flowchart of processing for creating a relationship graph in step S30 in FIG. 3. Note that when the item relationship graph is created, the processing in step S32 is not performed.

Step S31: Link Creation

In step S31, the graph construction unit 103 creates links between a plurality of items based on item features 122 stored in the feature storage unit 120. As described above, the item features according to the present embodiment includes an item ID, a genre ID, and a shop ID. That is, one item ID is associated with at least one genre ID and/or shop ID. Note that the genre ID and the shop ID may also be hierarchically configured. For example, the genre may be hierarchically configured, and each level of genre may include a genre ID. Also, the item features are not limited to an item ID, a genre ID, and a shop ID, and may also include other pieces of information (attributes) such as information relating to a brand, color, properties, and a price of an item.

Figure 7:
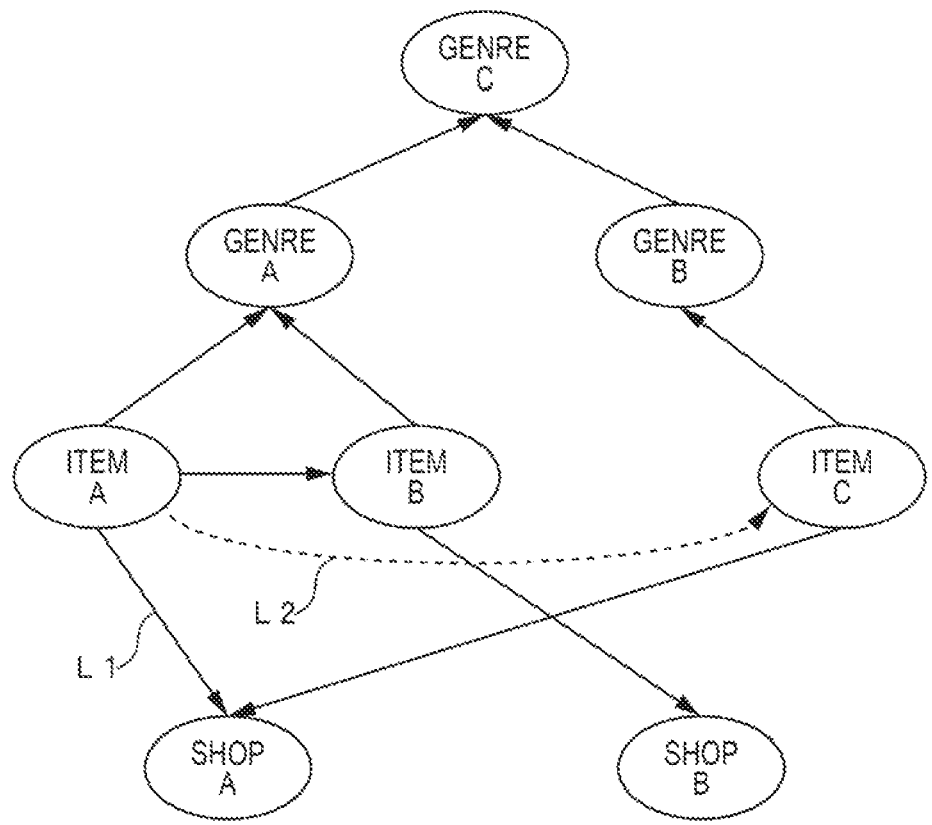
FIG. 7 shows a conceptual diagram of an item relationship graph.

The graph construction unit 103 forms a link between a genre ID and a shop ID that are associated with any item ID, and the any item ID. FIG. 7 shows a conceptual diagram of the item relationship graph. The item relationship graph is constituted by connections of nodes indicating an item ID, a genre ID, or shop ID that are circled in FIG. 7, and in the following description, the nodes are simply referred to as items, genres, or shops.

In FIG. 7, the links connected based on item features are explicit links, and are shown by solid lines (e.g., a link L1 between an item A and a shop A). Also, if the color or property is similar between items (if the similarity is higher than a predetermined threshold), the items can be connected by an explicit link (e.g., a link between the item A and an item B). On the other hand, there are cases where different items are sold in one shop. In FIG. 7, an item A and an item C are sold in a shop A, and therefore are linked to the shop A. Accordingly, the graph construction unit 103 can connect the item A and the item C by an implicit link shown by a broken line (in the example in FIG. 7, a link L2 between the item A and the item C). Note that, by performing learning (representation learning, relationship learning, embedding learning, knowledge graph embedding) of an item relationship graph constituted by nodes (users) that are connected by explicit links, the graph construction unit 103 predicts and creates implicit links between items. At this time, the graph construction unit 103 may perform the learning based on a known embedding model or its extension, as appropriate.

Step S33: Score Assignment Based on Closeness of Relationship

In step S33, the graph construction unit 103 predicts a score (closeness score) based on a closeness of the relationship of each pair in the links created in step S31, and assigns the score to the pair. In FIG. 7, when the item A is sold (traded) better than the item B in the genre A, a high score is assigned to a pair of the item A and the genre A, for example. Also, when it is determined that the probability that the item A belongs to the genre A is high, a high score based on that probability is assigned to the pair of the item A and the genre A. Also, when the similarity between any items is high, a high score is assigned to a pair of the items.

The graph construction unit 103 may also predict a closeness score assigned to each pair using the aforementioned score prediction model 112. When the score prediction model 112 is used, training is performed using, as training data, closeness scores (0 to 1) assigned to features, such as the number of transactions and the similarity between items, of any pairs between items, genres, and shops (see FIG. 6B). For example, in the training stage, combined data of a closeness score close to 1 set for a feature of the number of transactions being large or the similarity being high, and a closeness score close to 0 set for the feature of the number of transactions being small or the similarity being low is used as training data. The training processing is performed by the training unit 106. As a result of assigning scores, the score of each pair can be represented as a numeric value, similarly to the user relationship graph shown in FIG. 6C.

(3) Procedure for Creating User-Item Relationship Graph

Next, a procedure for creating a user-item relationship graph will be described. Similarly to the procedure for creating the user relationship graph, the graph construction unit 103 creates a user-item relationship graph in accordance with the flowchart of processing for creating a relationship graph in step S30 in FIG. 3. Note that when the user-item relationship graph is created, the processing in step S32 is not performed.

Step S31: Link Creation

In step S31, the graph construction unit 103 creates links between any user and one or more items based on the user features 121 and the item features 122 stored in the feature storage unit 120. First, the graph construction unit 103 acquires user features related to items for each user such as a purchase history, a search history, or a viewing history (including a click history) from the user features 121 stored in the feature storage unit 120. The graph construction unit 103 creates a user-item relationship graph for each user using user features related to the items for the user.

Figure 8A:
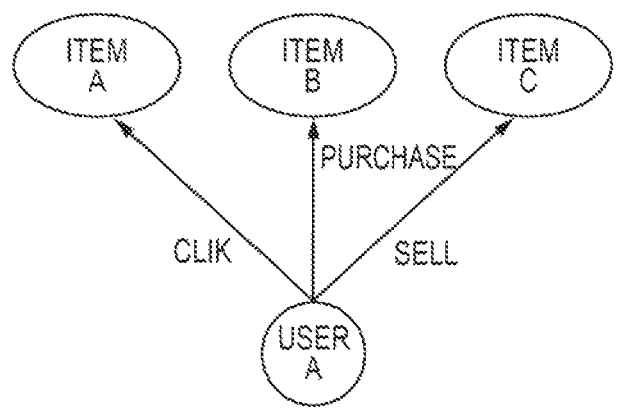
FIG. 8A shows a conceptual diagram of a user-item relationship graph.

FIG. 8A shows a conceptual diagram of the user-item relationship graph. The user-item relationship graph is constituted by connections of user nodes and nodes indicating item IDs that are circled in FIG. 8A, and in the following description, the user nodes and the nodes indicating item IDs are simply referred to as users and items. Also, actions by users on items such as "purchase", "click", and "sell" are referred to as interactions between users and items.

In FIG. 8A, a link is formed between a user A and an item A based on a click history performed on the item A by the user A. The click history of the item A includes a click on a predetermined screen area (e.g., button, photograph, icon) for the item A on the display unit of the user apparatus 11. Also, a link is formed between the user A and an item B based on a history of purchase of the item B made by the user A. Also, a link is formed between the user A and an item C based on a history of selling the item C made by the user A. Note that, in FIG. 8A, the user A and the items are connected by explicit links, but an indirect connection from the user A to any item may also be represented by an implicit link. Also, a link may be formed between a user and an item based on a history of distribution of advertisement of the item to the user. Note that the graph construction unit 103 predicts and creates implicit links between users and items by performing learning (representation learning, relationship learning, embedding learning, knowledge graph embedding) of a user-item relationship graph constituted by nodes (users) connected by explicit links. At this time, the graph construction unit 103 may perform the learning based on a known embedding model or its extension, as appropriate.

Step S33: Score Assignment Based on Closeness of Relationship

In step S33, the graph construction unit 103 assigns a score (closeness score) based on the closeness of the relationship for each pair connected by a link created in step S31, to the pair.

In the present embodiment, the graph construction unit 103 may assign a closeness score that does not take into account changes in a time-series relationship and a closeness score that takes into account changes in a time-series relationship between a user and an item to a pair of the user and item. Note that the graph construction unit 103 may assign only the closeness score that takes into account changes in a time-series relationship to the pair of the user and the item. In the following description, the closeness score that does not take into account changes in a time-series relationship between a user and an item is referred to as a "non-time-series relationship-based closeness score," and a closeness score that takes into account changes in a time-series relationship between a user and an item is referred to as a "time-series relationship-based closeness score.

Non-Time-Series Relationship-Based Closeness Score

The graph construction unit 103 may predict the closeness score for a pair of a user and an item, based on a history related to the transaction of items such as the aforementioned click history, purchase history, selling history, and advertisement distribution history, and assign the score to the pair. For example, it can be said that the distance between a user and an item is closer when the user has actually purchased the item than when the user merely clicked the item. Therefore, in the example in FIG. 8A, a higher score is assigned to the pair of the user A and the item B than the pair of the user A and the item A. Also, the relationship between a user and an item is considered to be closer when the user sells the item than when the user performs click operation, and in the example in FIG. 8A, a higher score is assigned to the pair of the user A and the item C than the pair of the user A and the item A (a high weight is given to the link between the user A and the item C). Also, when a user has not performed clicking or purchasing of an item, even if an advertisement of the item is distributed to the user a plurality of times, a low score may be assigned to the pair of the user and the item, for example.

The graph construction unit 103 may also predict the closeness score for each pair using the aforementioned score prediction model 112. When the score prediction model 112 is used, training is performed using closeness scores (0 to 1) assigned to features of pairs of users and items as training data (see FIG. 6B). For example, in the training stage, combined data of a closeness score close to 1 set for a feature of purchasing and a closeness score close to 0 set for a feature of clicking is used as training data. The training processing is performed by the training unit 106. As a result of assigning scores, the score of each pair can be represented as a numeric value, similarly to the user relationship graph shown in FIG. 6C.

Note that in FIG. 8A, a user-item relationship graph is defined as pairs of a user and an item, but when a user has a history of clicking, purchasing, or selling a specific item, a link is formed between the user and a genre (genre ID). Also, a closeness score is assigned to the feature shared by the pair.

Time-Series Relationship-Based Closeness Score

Next, a time-series relationship-based closeness score will be described.

Figure 8B:
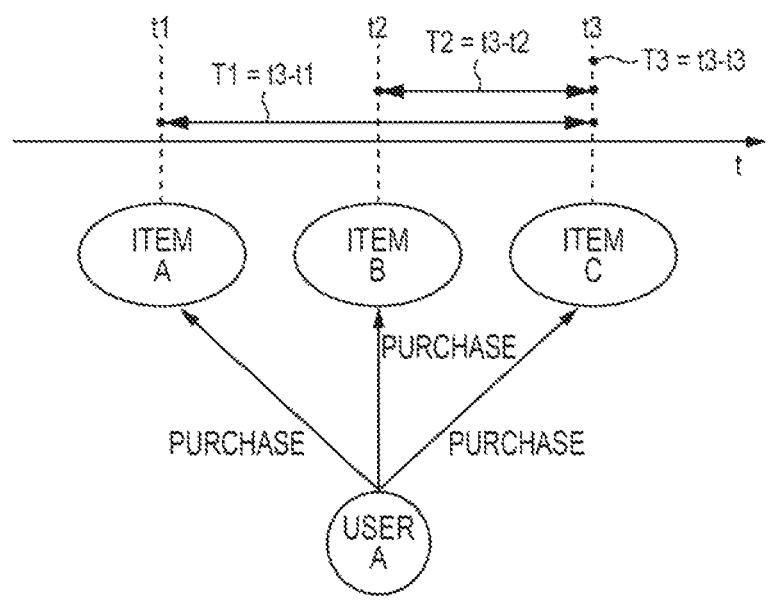
FIG. 8B shows an example of a conceptual diagram of a user-item time-series relationship.

FIG. 8B shows an example of a conceptual diagram of a user-item time-series relationship. The example in FIG. 8B shows the case where the user A purchased the item A at time t1, the item B at time t2, and the item C at time t3. Note that times t1, t2, and t3 are representations that include the date and time when the user A performed the purchase action for each item, and t3>t2>t1 in the time sequence (i.e., as t1 becomes t3, it approaches the present). Therefore, the user A recently purchased the item A among the items A to C.

In a case where time t3 is the reference time (reference date and time) when the user A purchased the item C, the user A would have purchased the item A before relative time T1 (=t3−t1) from time t3, purchased the item B before relative time T2 (=t3−t2) from time t3, and purchased the item C at relative time T3. The item related to a longer relative time is an item that was purchased by the user A more in the past, and can be considered as an item having a lower relationship with the user A when time t3 is used as the reference time. Therefore, in the present embodiment, the graph construction unit 103 calculates the relative time and assigns a lower closeness score to a pair of a user and an item related to a longer relative time. In the example in FIG. 8B, the closeness score is configured to be highest for the pair of the user A and the item C (the highest weight is given to the link between the user A and the item C), and be lower for the pair of the user A and the item B, and for the pair of the user A and the item A in that order (the links between users and items are weighted lower in order). For example, when the closeness score for the pair of the user A and the item C is 1, the graph construction unit 103 assigns the inverse of the relative time to the closeness scores for the pair of the user A and the item B and the pair of the user A and the item A (1/T2 and 1/T1, respectively).

Figure 8C:
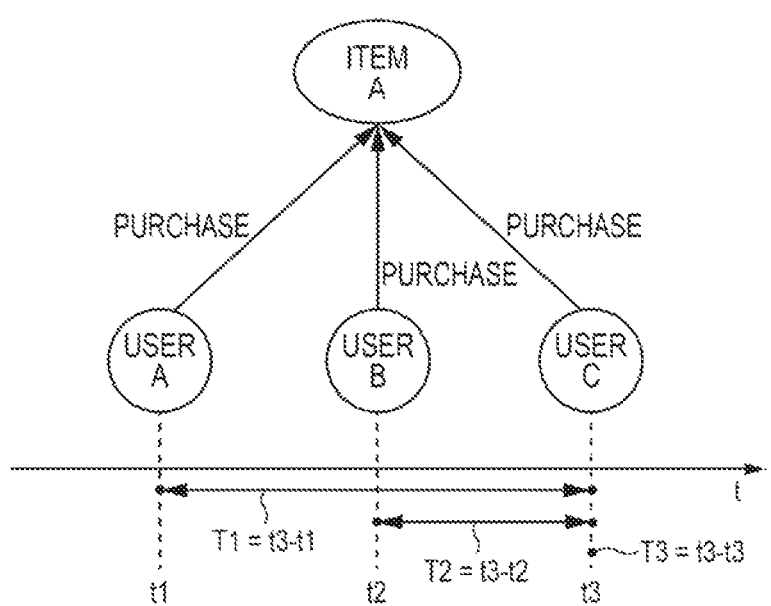
FIG. 8C shows another example of a conceptual diagram of a user-item time-series relationship.

FIG. 8C shows another example of a conceptual diagram of a user-item time-series relationship. The example in FIG. 8C shows the case where the user A purchased the item A at time t1, the user B purchased the item A at time t2, and the user C purchased the item A at time t3. Note that times t1, t2, and t3 are representations that include the date and time when the user A, the user B, and the user C each performed the purchase action of the item A, and t t3>t2>t1 in the time sequence (i.e., as t1 becomes t3, it approaches the present). Therefore, among the users A to C, the user C recently purchased the item A.

In a case where that t3 is the reference time (reference date and time) when the user C purchased the item A, the user A would have purchased item A before relative time T1 (=t3−t1) from time t3, the user B would have purchased the item A before relative time T2 (=t3−t2) from time t3, and user C would have purchased the item A at relative time T3. The user related to a longer relative time is a user who purchased the item A more in the past, and can be considered as a user having a lower relationship with the item A when time t3 is used as the reference time. Therefore, in the present embodiment, the graph construction unit 103 calculates the relative time and assigns a lower closeness score to the pair of the user and the item related to a longer relative time. In the example in FIG. 8C, the closeness score is configured to be highest for the pair of the user C and the item A (the highest weight is given to the link between the user C and the item A), and be lower for the pair of the user B and the item A, and for the pair of the user A and the item A in that order (the links between users and items are weighted lower in order). For example, when the closeness score for the pair of the user C and the item A is 1, the graph construction unit 103 assigns the inverse of the relative time to the closeness scores for the pair of the user B and the item A and the pair of the user A and the item A (1/T2 and 1/T1, respectively).

It should be noted that a period in the past from the reference time in which the relationship between the user and the item may exist (a period in which the relationship can be considered) may be set in advance. For example, with reference to FIG. 8B, in a case where the time when the user A purchased the item D (not shown) is 10 years before the reference time t3, the relationship between the user A and the item D (especially the relationship about the purchase) can be considered low. Therefore, for example, the period from the reference time to a predetermined period (e.g., one year) may be set as a period in which the relationship between the user and the item can be considered.

Also, in FIGS. 8B and 8C, an interaction between users and items is "purchase," and time t1, t2, and t3 are the date and time the "purchase" occurred, but the interaction may include "click" or "sell" as in FIG. 8A. Furthermore, in FIGS. 8B and 8C, the interaction between users and items may be any of "purchase," "click," and "sell". Here, "click" corresponds, as an example, to accessing a web page of an item on a given platform where items can be traded commercially. The interaction may also be "introduction" such as generating a link to access the web page of the item or posting the web page of the item on an external platform such as a social networking service (SNS). The interaction may also be "registration" such as registering the web page of the item as a favorite. Note that, according to a type of the interaction, the weighting for a link may be determined so that the closeness score of the pair of the user and the item is higher. As an example, when the interaction is "purchase" or "sell", the weighting for the link may be determined so that the closeness score of the pair of the user and the item is higher than that of "click". is described In FIGS. 8B and 8C, the closeness score in the explicit links between the user and the item due to the user explicitly performing "purchase", "click", or "sell" of the item as shown in FIG. 8A is described. In addition to this, the graph construction unit 103 may generate implicit links between users and items and predict closeness scores in such implicit links. For example, when two users are similar to each other, one of the users that is not linked to the item may be linked to the item by an implicit link. Similarly, when two items are similar to each other, one of the items that is not linked to the user may be linked to the user by an implicit link. Note that "users are similar to each other" or "items are similar to each other" means that the similarity between nodes based on the closeness between users or items (between nodes) in the graph satisfies a predetermined condition. At this time, the closeness between nodes is based on the Euclidean distance or cosine similarity between nodes in the feature space where the graph is constructed.

Figure 8D:
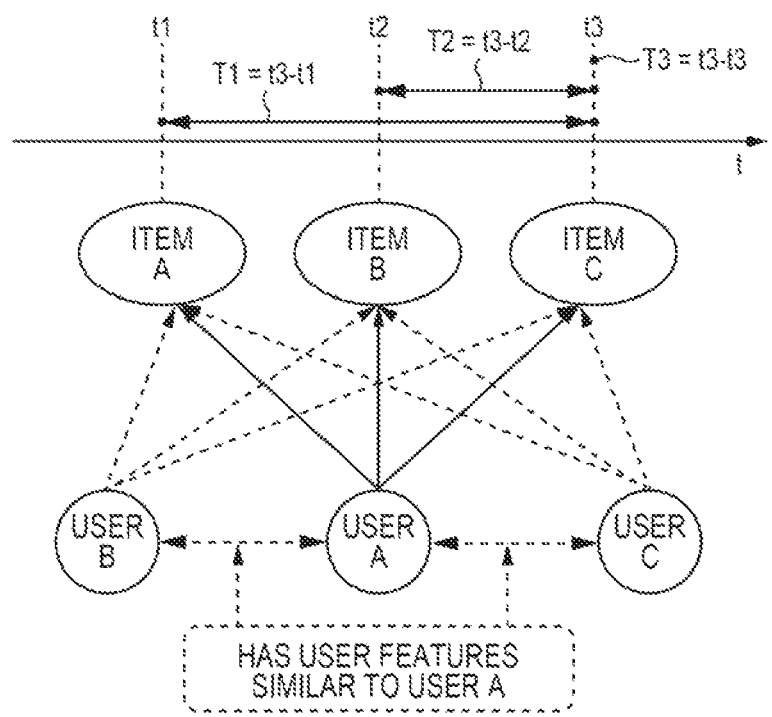
FIG. 8D shows an example of a conceptual diagram of a user-item time-series relationship in implicit links.

FIG. 8D shows an example of a conceptual diagram of a user-item time-series relationship in implicit links. The graph construction unit 103 can link a user similar to the user A (e.g., a user having user features similar to the user A) to the items A, B, and C by implicit links. For example, when the user B and the user C have the same gender and similar occupations and family structures as the user A, the graph construction unit 103 can link each of the user B and the user C to the items A, B, and C by the implicit links. At this time, the graph construction unit 103 may assign closeness scores between the user B and each of the items A, B, and C, and closeness scores between the user C and each of the items A, B, and C so that they are lower than the closeness score between the user A and each of the items A, B, and C.

FIG. 8E shows another example of a conceptual diagram of a user-item time-series relationship in implicit links. The graph construction unit 103 can link an item similar to the item A (e.g., an item having similar item features to the item A) to the users A, B, and C by implicit links. For example, when the items B and C have the same brand, color, and similar price as the item A, the graph construction unit 103 can link each of the items B and the item C to each of the users A, B, and C by the implicit links. At this time, the graph construction unit 103 may assign closeness scores between the item B and each of the users A, B, and C, and between the item C and each of the user A, B, and C so that they are lower than the closeness score between the item A and the users A, B, and C.

In addition, the implicit links between users and the items may be generated using one or more top items in best-selling rankings in any web service. The top items in the best-selling rankings change over time. For example, with reference to FIG. 8B, the one or more top items in a best-selling ranking at times t1, t2, and t3 in a predetermined web service may be linked to the user A by the implicit links. Therefore, information on time-series trending items at each time (date and time) is reflected in a pair of a user and an item.

Besides, a user's motivation to purchase an item may increase on a specific day for the user. The specific day may be a day in a campaign period during which more points than usual will be awarded for purchases made in a web service. Alternatively, the specific day may be a day in a period during which a sale is taking place. Alternatively, the specific day may be a birthday of a user or another user close to the user, Mother's Day, or any seasonal event day (e.g., Christmas). When the user purchases an item on such a specific day, the closeness score between the user and the item may be set higher.

Figure 8F:
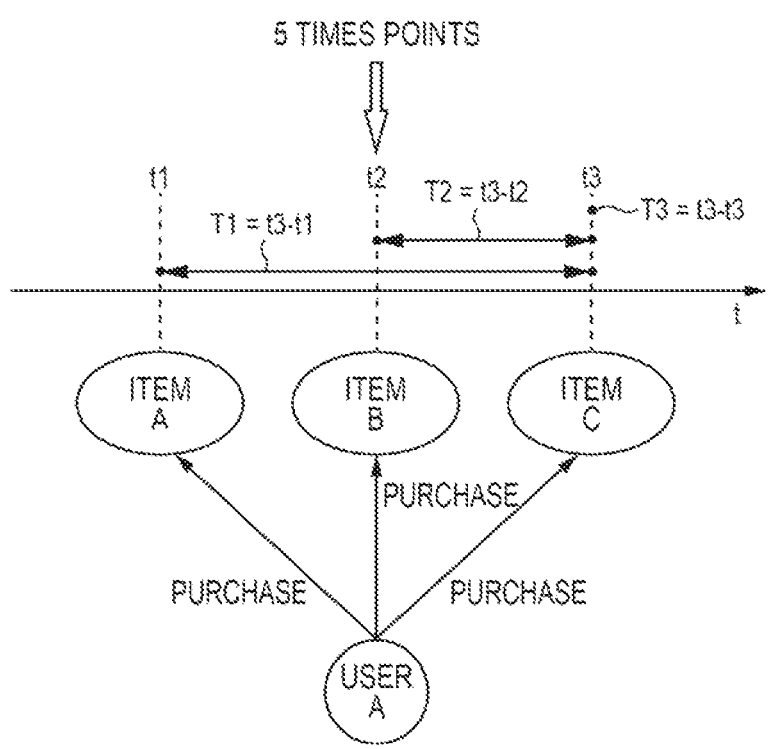
FIG. 8F shows an example of user's purchase on a specific day in a conceptual diagram of a user-item time-series relationship.

FIG. 8F shows an example of user's purchase on a specific day in a conceptual diagram of a user-item time-series relationship shown in FIG. 8B. FIG. 8F shows that a day including time t2 is a specific day, and that the specific day is a day in a campaign period during which 5 times points will be awarded. The user A may have dared to purchase the item B on the date and time (time t2) when 5 times points will be awarded. For example, since the item B is expensive, the user A may have selected time t2, when more points will be awarded, as the purchase date and time of the item B. That is, the graph construction unit 103 may assign a higher value to the closeness score for the pair of the user A and the item B in FIG. 8F than the closeness score for the pair of the user A and the item B in FIG. 8B. Furthermore, the graph construction unit 103 may add, to the user features of the user A, the feature indicating purchase history on the 5 times point day.

As mentioned above, in the present embodiment, the graph construction unit 103 can assign the non-time-series relationship-based closeness score and the time-series relationship-based closeness score to the pair of the user and the item. When assigning the non-time-series relationship-based closeness score and the time-series relationship-based closeness score, the graph construction unit 103 may assign a score that is the non-time-series relationship-based closeness score plus the time-series relationship-based closeness score. Alternatively, the graph construction unit 103 may assign a score that is a product of the non-time-series relationship-based closeness score and the time-series relationship-based closeness score.

Therefore, in the present embodiment, the graph construction unit 103 constructs a knowledge graph that reflects the time-series relationship between the user and the item. Specifically, the graph construction unit 103 assigns the closeness score between the user and the item based on time-series information such as relative time (T1, T2, and T3) and relative relationships at each time (T1, T2, and T3) calculated as described above (changes the weighting of links between the user and the item). In this way, the knowledge graph that reflects the user interest in and awareness of items, which may change over time, is generated. Note that in the present embodiment, with reference to FIGS. 8B and 8C, the relative times or the relative relationships for three interactions (i.e., purchases) between users and items are obtained, but those for any two or more interactions (a user and two or more items, or two or more users and an item) may be obtained. Also, the reference time (reference date and time) for obtaining the relative time or the relative relationship may be set arbitrarily.

(4) Procedure for Constructing Entire Knowledge Graph

After the user relationship graph, user-item relationship graph, and item relationship graph are created using the procedures (1) to (3) described above, in step S34 in FIG. 3, the graph construction unit 103 constructs (creates) the entire knowledge graph by connecting these graphs. In the upper part of FIG. 9, a conceptual diagram (knowledge graph 90) of the knowledge graph is shown. The graph construction unit 103 connects the created user relationship graph, user-item relationship graph, and item relationship graph using nodes that are in common between these graphs as connection points. Next, the graph construction unit 103 constructs the knowledge graph by performing streamlining such as deleting duplicate links. Although not shown in FIG. 9, closeness scores indicating closeness between nodes are assigned to inter-nodes between nodes (users, items, genres, and the like). Note that the closeness score may be represented by the length of an arrow. Also, although not shown in FIG. 9, each user includes user features, or user features are connected to the user as a node. Note that the nodes such as users, items, and genres correspond to entities (head entities or tail entities) in a knowledge graph, and the pairs and links correspond to relations.

The graph construction unit 103 may construct the entire knowledge graph by connecting the fact-based user relationship graph, item relationship graph, and user-item relationship graph that are constituted by nodes connected by explicit links and the explicit links. Also, the graph construction unit 103 may construct the entire knowledge graph by connecting some relationship graphs of the user relationship graph, item relationship graph, and user-item relationship graph that are fact-based relationship graphs and are constituted by nodes connected by explicit links and the explicit links and the remaining relationship graphs of the user relationship graph, item relationship graph, and user-item relationship graph that are constituted by nodes connected by explicit links, the explicit links, nodes connected by implicit links, and the implicit links. That is, in the entire knowledge graph, at least one of the user relationship graph, item relationship graph and user-item relationship graph may not include implicit links. Also, the graph construction unit 103 may predict and create implicit links between nodes by embedding the created knowledge graph into a feature space (vector space). That is, the graph construction unit 103 may predict and create implicit links from a knowledge graph constituted only by explicit links. Note that the embedded representations (vector representations) of entities such as user representations may also be extracted (acquired) based on the entire knowledge graph in which at least one of the user relationship graph, item relationship graph, and user-item relationship graph does not include implicit links.

Procedure for Extracting User Representation

Next, a procedure for extracting a user representation according to the present embodiment will be described. The representation extraction unit 104 extracts a user representation for any user from a knowledge graph constructed by the graph construction unit 103. Specifically, the representation extraction unit 104 embeds the knowledge graph in a feature space (vector space), and learns embedded representations (vector representations) of nodes (entities) and links (relations) in the feature space. The representation extraction unit 104 performs learning (representation learning, relationship learning, embedding learning) of the knowledge graph, and extracts (acquires) an embedded representation (low-dimensional vector representation) of any user as the user representation (user feature vector).

The representation extraction unit 104 may adopt a translation-based model that performs learning based on distances between vector representations of entities such as TransE, TransD, and RotatE, as an embedding model to be used for learning of (embedding) a knowledge graph. Also, the representation extraction unit 104 may adopt an embedding-projection model that performs learning by mapping vector representations of entities such as TransH, TransR, and STransE to a vector space that is different for each relation. The representation extraction unit 104 may also adopt a model that performs learning using conversion of vector representations such as ComplEx into a complex number space. The representation extraction unit 104 may also adopt a model that performs learning using a convolutional neural network (NN) that includes an NN such as ConvE, ConvR, or R-GCN. Also, the representation extraction unit 104 may adopt a model that uses an attention mechanism such as a knowledge graph attention network (KGAT), and adopt a known model such as TorusE and its extension, as appropriate. Note that the representation extraction unit 104 may use regularization (L1 regularization, L2 regularization, or the like) when learning of the knowledge graph is performed, as appropriate.

Features of nodes and closeness scores assigned to internodes (pairs, links) may be reflected on the user representation. Here, the representation extraction unit 104 may perform learning (embedding of knowledge graphs) of vector representations of nodes and links while performing weighting on the vector representations for links (relations) between nodes based on closeness scores between nodes. Also, the representation extraction unit 104 may extract a vector representation of an entity such as any user, by selectively or exclusively learning vector representations of links whose closeness scores exceed or are lower than a predetermined threshold and of nodes connected through the links. Here, the nodes at least include nodes corresponding to an entity such as any user. Also, the representation extraction unit 104 may extract a vector representation of an entity such as any user, by selectively or exclusively learning vector representations of nodes and links in the $N^{th}$ (N>1) neighbor of the node corresponding to the entity such as the user. In this way, the calculation load can be reduced by screening targets to be learned according to the closeness score.

Figure 9:
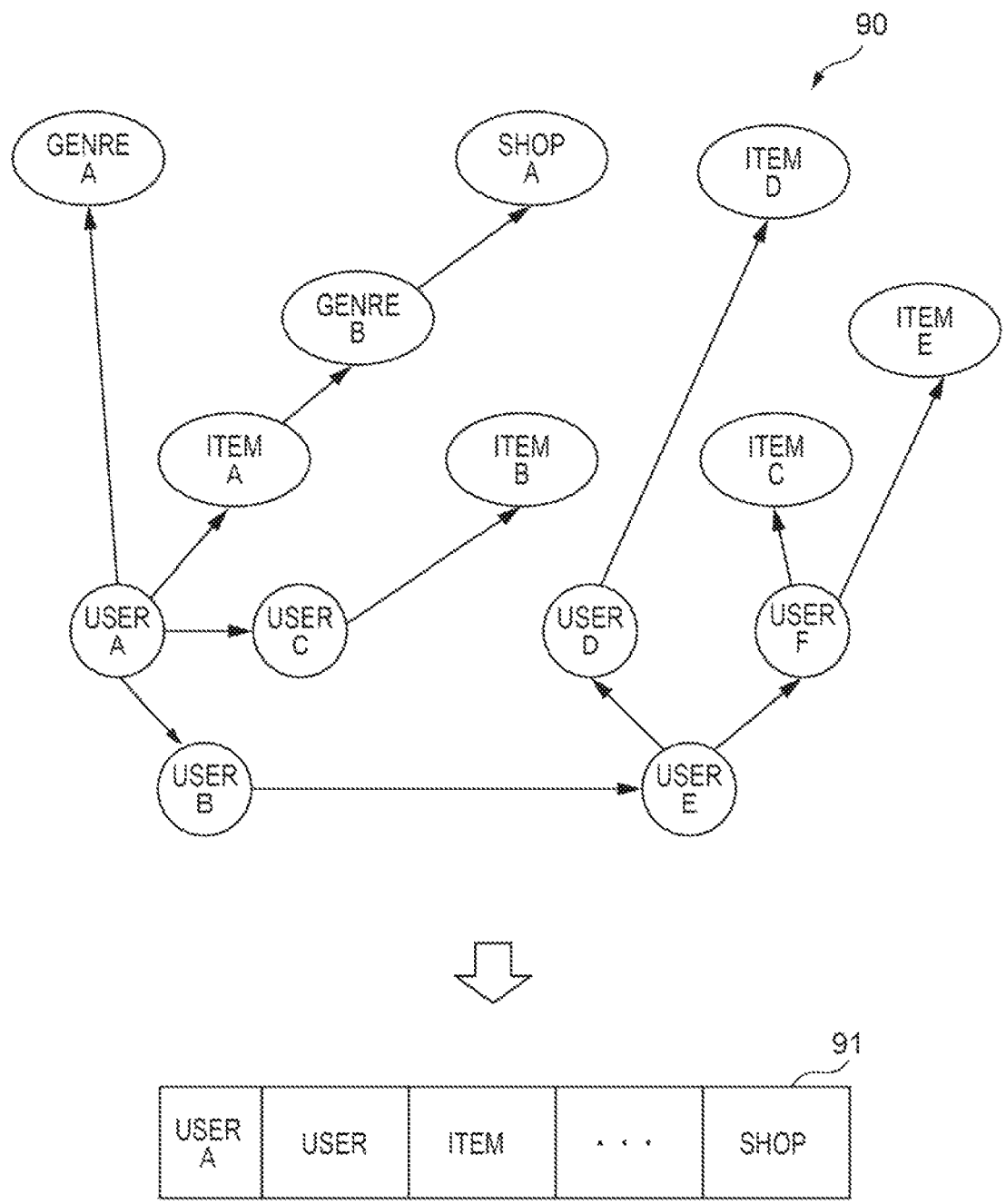
FIG. 9 shows a conceptual diagram of a knowledge graph and a user representation.

A conceptual diagram (user representation 91) of a user representation (node representation) extracted for the user A is shown in the lower part in FIG. 9. In the user representation 91, pieces of information regarding one or more users, items, genres, and shops that are connected to the user A by implicit and explicit links are reflected on one user representation. Closeness scores of nodes (item, genre, and the like) connected to the user A may also be represented in the user representation. That is, the user representation of the user A may correspond to a neighboring representation on which closenesses of relationships between the user A and the nodes are reflected.

The representation extraction unit 104 may also extract an item representation (node representation) for any item from the knowledge graph constructed by the graph construction unit 103.

Modification of User Representation

The representation extraction unit 104 may extract (generate) user expressions and item features using the aforementioned time-series relationships between users and items. The following description will refer to FIGS. 8B and 8C for the user A and the item A, but the same processing may be applied to other users and items.

With reference to FIG. 8B, the user features of the user A will be described. The representation extraction unit 104 encodes (weights) the respective item features of the items A, B, and C using the relative times T1, T2, and T3 in FIG. 8B. Here, the representation extraction unit 104 may encode the respective item features of the items A, B, and C according to the relative positions of the times t1, t2, and t2 on the time axis in FIG. 8B.

The representation extraction unit 104 then aggregates the item features of the encoded items A, B, and C and concatenates the aggregated item features with the user features of the user A.

With reference to FIG. 8C, the item features of the item A will be described. The representation extraction unit 104 encodes (weights) the respective user features of the users A, B, and C using the relative times T1, T2, and T3 in FIG. 8C. Here, the representation extraction unit 104 may encode the respective user features of the users A, B, and C according to the relative positions of time t1, t2, and t2 on the time axis in FIG. 8C.

The representation extraction unit 104 then aggregates the encoded user features of the users A, B, and C and concatenates the aggregated user features with the item features of the item A.

Through the above processing, the information processing apparatus 10 extracts (generates) the user representation and the item representation. The user representation and the item representation are to be used as input data for a predetermined prediction processing to be performed by the information processing apparatus 10. In other words, the information processing apparatus 10 constructs a knowledge model capable of extracting, from the knowledge model, representations that represent relationships between users and items for any user or any item and are to be used as input data for the predetermined prediction processing to be performed by the information processing apparatus 10. The following will describe processing for predicting a prospective user as an example of the predetermined prediction processing.

Processing for Predicting Prospective user

Next, processing for predicting a prospective user according to the present embodiment will be described. The prospective user prediction model 111 is a learning model for predicting, as a prospective user, a user having a similar feature as a seed user. The seed user is a user that has purchased and/or used a given product or service through a web service, and/or a user that has positively evaluated the product or service through the web service.

The prospective user prediction model 111 is a learning model for machine learning based on XGBoost, for example. In the training stage, the training unit 106 trains the prospective user prediction model 111 using user features of a seed user (positive user), user features of users (negative users) other than the seed user, and user representations of these users. The user features are base user features, and include a purchase history (information regarding genre and type of a product, or the like) in the web service. The demographic information and the purchase history may include a plurality of subdivided features. Note that the user features are not limited to demographic information and a purchase history, and may also include other features such as a point status (number of points that can be used), a point feature (information regarding a point transaction such as information regarding points acquired from an offline shop or an online shop, points used, and the like).

The training unit 106 verifies and tunes (adjusts) hyper parameters (parameters for controlling the behavior of the prospective user prediction model 111) by grid search and cross validation. Because XGBoost is a tree (decision tree)-based model, the prospective user prediction model 111 can generate a result that shows how the input data (user features) affects the output of the model. This makes it possible to verify which of the user features (combinations of subdivided features) are highly affected by the seed user, for example.

The trained prospective user prediction model 111 is configured to output the likelihood (likelihood of being a prospective user) that a user has user features similar to those of the seed user. The likelihood is represented by a numeric value from zero to one, where the largest likelihood is one, for example. Here, when the threshold is set to 0.5, the prospective user prediction unit 105 can predict (determine) that a user having a likelihood larger than 0.5 is a prospective user (that is, a potential user having features similar to those of the seed user). Note that there may also be a plurality of seed users, and in this case, the prospective user prediction unit 105 can predict a user having user features similar to those of the users included in the plurality of seed users (seed user group (model user group)), as a prospective user.

Figure 10:
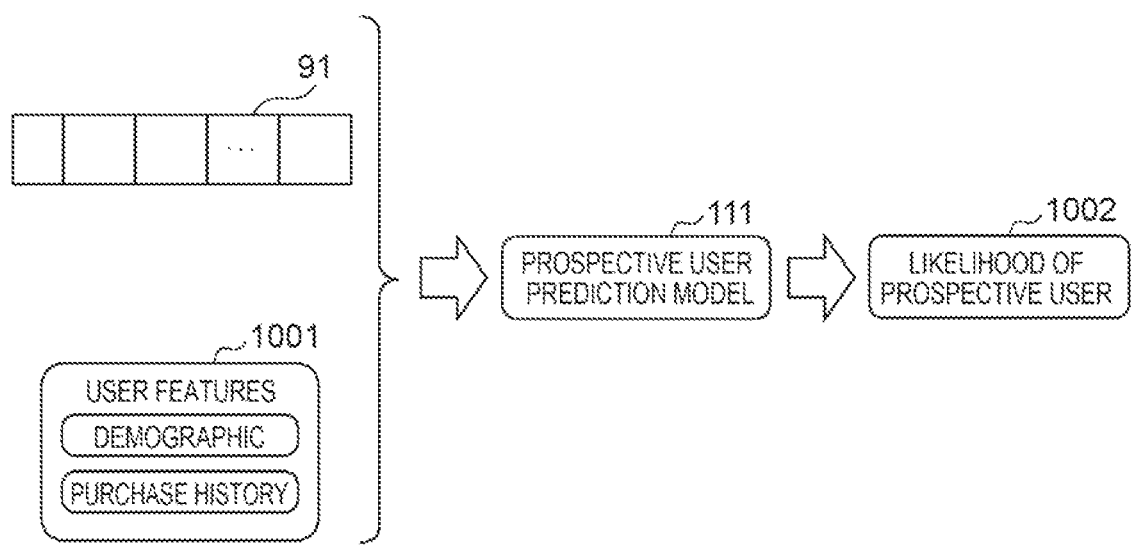
FIG. 10 is a diagram for describing prospective user prediction processing.

In the present embodiment, for any user, the prospective user prediction unit 105 inputs a user representation extracted by the representation extraction unit 105 and base user features to the prospective user prediction model 111, and predicts whether or not the user is a prospective user. FIG. 10 is a diagram for describing prospective user prediction processing according to the present embodiment. When a user A is set as any user (target user), the prospective user prediction unit 105 inputs base user features 1001 of the user A and a user representation 91 extracted by the representation extraction unit 104 to the prospective user prediction model 111, and predicts whether or not the user A is a prospective user. Specifically, the prospective user prediction unit 105 predicts and outputs the likelihood (likelihood 1002 of a prospective user) that the user A has user features similar to those of the seed user, from the user features 1001 of the user A and the user representation 91.

Hardware Configuration of Information Processing Apparatus 10

Figure 11:
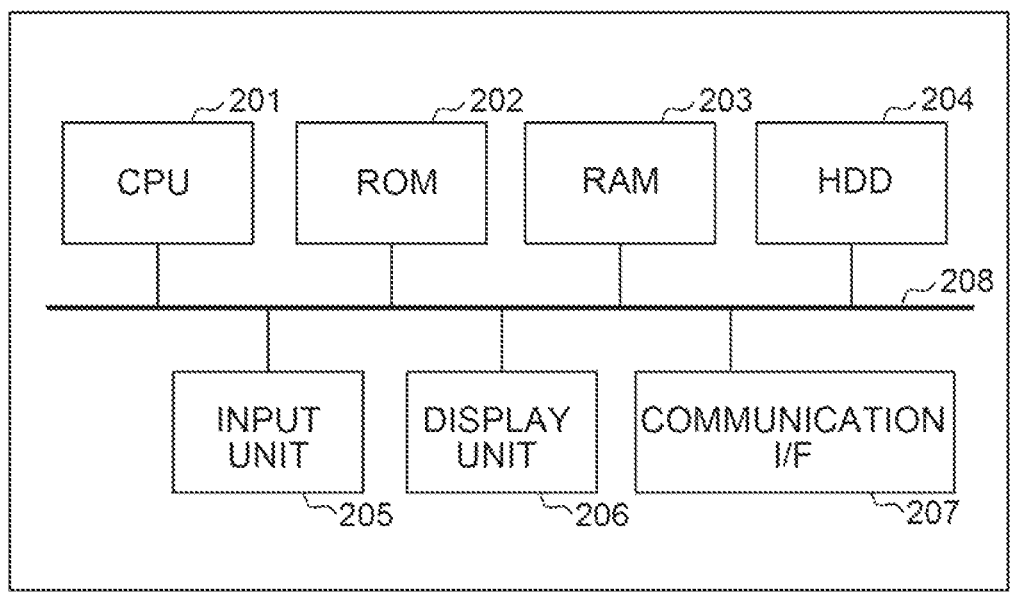
FIG. 11 shows exemplary hardware configurations of the information processing apparatus 10 and a user apparatus 11.

FIG. 11 is a block diagram showing an example of a hardware configuration of the information processing apparatus 10 according to this embodiment.

The information processing apparatus 10 according to the present embodiment can be implemented also on any one or more computers, mobile apparatuses, or other processing platforms.

With reference to FIG. 11, an example is shown in which the information processing apparatus 10 is implemented on a single computer, but the information processing apparatus 10 according to the present embodiment may be implemented on a computer system including a plurality of computers. The plurality of computers may be connected so as to be capable of mutual communication through a wired or wireless network.

As shown in FIG. 11, the information processing apparatus 10 may include a CPU 201, a ROM 202, a RAM 203, an HDD 204, an input unit 205, a display unit 206, a communication I/F 207, and a system bus 208. The information processing apparatus 10 may include an external memory.

The CPU (Central Processing Unit) 201 performs overall control of operations in the information processing apparatus 10, and controls each constituent unit (202 to 207) via the system bus 208, which is a data transmission path.

The ROM (Read Only Memory) 202 is a non-volatile memory that stores control programs and the like needed for the CPU 201 to execute processing. Note that the program may also be stored in a non-volatile memory such as the HDD (Hard Disk Drive) 204 or an SSD (Solid State Drive), or an external memory such as a detachable storage medium (not shown).

The RAM (Random Access Memory) 203 is a volatile memory and functions as a main memory, a work area, and the like of the CPU 201. That is, during execution of processing, the CPU 201 executes various functional operations by loading necessary programs and the like from the ROM 202 to the RAM 203, and executing the programs and the like. The learning model storage unit 110 and the feature storage unit 120 shown in FIG. 2 can be constituted by the RAM 203.

The HDD 204 stores various types of data, various types of information, and the like that are needed when the CPU 201 performs processing using a program. Also, the HDD 204 stores various types of data, various types of information, and the like obtained by the CPU 201 performing processing using a program or the like.

The input unit 205 is constituted by a keyboard or a pointing apparatus such as a mouse.

The display unit 206 is constituted by a monitor such as a liquid crystal display (LCD). The display unit 206 may also function as a GUI (Graphical User Interface) due to being included in combination with the input unit 205.

The communication I/F 207 is an interface that controls communication between the information processing apparatus 10 and an external apparatus.

The communication I/F 207 provides an interface with a network and executes communication with an external apparatus via the network. Various types of data, various types of parameters, and the like are transmitted and received to and from the external apparatus via the communication I/F 207. In this embodiment, the communication I/F 207 may execute communication via a wired LAN (Local Area Network) or a dedicated line conforming to a communication standard such as Ethernet (registered trademark). However, the network that can be used in this embodiment is not limited thereto, and may also be constituted by a wireless network. This wireless network includes a wireless PAN (Personal Area Network) such as Bluetooth (registered trademark), ZigBee (registered trademark), and UWB (Ultra Wide Band). This wireless network also includes a wireless LAN (Local Area Network) such as Wi-Fi (Wireless Fidelity) (registered trademark) and a wireless MAN (Metropolitan Area Network) such as WiMAX (registered trademark). Furthermore, the wireless network includes a wireless WAN (Wide Area Network) such as LTE/3G, 4G, and 5G. Note that it is sufficient that the network connects the apparatuses such that communication is possible therebetween and is capable of communication, and the standard, scale, and configuration of communication is not limited to the above.

The function of at least some of the elements of the information processing apparatus 10 shown in FIG. 2 can be realized by the CPU 201 executing a program. However, the function of at least some of the elements of the information processing apparatus 10 shown in FIG. 2 may also operate as dedicated hardware. In this case, the dedicated hardware operates based on control performed by the CPU 201.

Hardware Configuration of User Apparatus 11

The hardware configuration of the user apparatus 11 shown in FIG. 1 may be the same as that shown in FIG. 11. That is, the user apparatus 11 can include the CPU 201, the ROM 202, the RAM 203, the HDD 204, the input unit 205, the display unit 206, the communication I/F 207, and the system bus 208. The user apparatus 11 can display various types of information provided by the information processing apparatus 10 on the display unit 206 and perform processing corresponding to an input operation received from the user via the GUI (constituted by the input unit 205 and the display unit 206).

Flow of Processing

FIG. 12 shows a flowchart of processing executed by the information processing apparatus 10 according to the present embodiment. The processing shown in FIG. 12 can be realized by the CPU 201 of the information processing apparatus 10 loading a program stored in the ROM 202 or the like to the RAM 203 and executing the loaded program. The information processing system shown in FIG. 1 will be referred to for the description of FIG. 12. The prospective user prediction model 111 and the score prediction model 112 trained by the training unit 106 are stored in the learning model storage unit 110.

In step S1201, the user feature acquisition unit 101 acquires the user features of the users from the user apparatuses 11-1 to 11-N and stores the acquired user features in the feature storage unit 120 as the user features 121. Also, the item feature acquisition unit 102 acquires, from a predetermined database, features (attributes) of items based on registration information and a transaction history in various web services, and stores the acquired features in the feature storage unit 120 as item features 122. The processing of step S1201 may also be processing for acquiring (collecting) user features and item features of a predetermined past period.

In step S1202, the graph construction unit 103 constructs a knowledge graph. The procedure for creating the knowledge graph is as described above with reference to FIG. 3.

In step S1203, the representation extraction unit 104 extracts a user representation for any user from the knowledge graph created in step S1202. The procedure for extracting the user representation is as described above with reference to FIG. 9.

In step S1204, the prospective user prediction unit 105 predicts the likelihood that the user is a prospective user having features similar to those of a predetermined seed user. In the present embodiment, for the any user, the prospective user prediction unit 105 predicts and outputs the likelihood that the user is a user having features similar to those of the seed user (likelihood of a prospective user) by inputting base user features of the user and a user representation of the user into the prospective user prediction model 111, as shown in FIG. 10.

The prospective user can predict, from a plurality of users, prospective users having features similar to those of the predetermined seed user as a prospective user group (similar user group). In this case, the prospective user prediction unit 105 predicts the prospective user group by inputting, for each user, base user features of the user and a user representation of the user into the prospective user prediction model 111. Also, when there are a plurality of seed users (seed user group), the prospective user prediction unit 105 can predict, from a plurality of users, users having features similar to those of users included in the seed user group as a prospective user group.

In step S1205, the output unit 107 outputs a result regarding the likelihood of a prospective user predicted in step S1204. For example, when processing in steps S1203 and S1204 is performed with respect to a plurality of users, the output unit 107 can generate information regarding the prospective user group predicted from the plurality of users, and output the information to an external apparatus (not shown).

As described above, the information processing apparatus according to the present embodiment creates a user relationship graph, an item relationship graph, and a user-item relationship graph from user features of a plurality of users and features of a plurality of items. Also, the information processing apparatus acquires time-series information indicating time-series interactions between users and items (e.g., purchase of an item by a user). The information processing apparatus constructs (creates) a knowledge graph using these relationship graphs and time-series information. In the knowledge graph, with respect to any user, all users other than the any user and items (including genres, shops, and the like) that are related to the any user are linked, and the knowledge graph has links weighted based on the time-series information. Such a knowledge graph can be used for any prediction processing related to user behavior analysis.

Also, the information processing apparatus according to the present embodiment creates, for any user, a user representation that represents all users other than the any user and items that are related to the user, from the knowledge graph. The user representation is a representation in which one user is associated with features (attributes) of all other users and items. That is, the user representation is not a separate representation of any user with respect to each of other users and items, and is a representation configured by containing complex relationships with other users and items. Also, the user representation can reflect time-series interactions between users and items. Accordingly, the linkage of any user to other users and items can be handled as one representation, and it is possible to obtain an advantageous effect that the computation processing amount can be reduced when the user representation is used for any prediction processing to be performed.

It should be noted that although specific embodiments have been described above, the embodiments are merely examples, and are not intended to limit the scope of the present invention. The apparatuses and methods described in the present specification can be embodied in forms other than those described above. Also, the above-described embodiments can be subjected to omission, replacement, and modification as appropriate without departing from the scope of the present invention. Modes obtained through such omission, replacement, and modification are encompassed in the description of the claims and the range of equivalency thereto, and belong to the technical scope of the present invention.

EMBODIMENTS OF THE PRESENT DISCLOSURE

The present disclosure includes the following embodiments.

(1) An information processing apparatus includes: a feature acquisition unit configured to acquire user features indicating features for each of a plurality of users and item features indicating features for each of a plurality of items; a time-series information acquisition unit configured to acquire time-series information indicating time-series interactions between the plurality of users and the plurality of items; a construction unit configured to construct, based on the user features, the item features, and the time-series information, a graph including a plurality of user nodes representing the plurality of users, a plurality of item nodes representing the plurality of items, and links indicating interaction relationships in the plurality of user nodes and the plurality of item nodes; and an extraction unit configured to extract, from the graph, a node representation in the graph for any node among the plurality of user nodes and the plurality of item nodes.

(2) In the information processing apparatus according to (1), the construction unit weights the links based on the time-series information.

(3) In the information processing apparatus according to (1) or (2), the time-series information includes information of date and time when an interaction by any one of the plurality of users with each of two or more items of the plurality of items occurred.

(4) In the information processing apparatus according to (3), the construction unit assigns a higher weight to a link indicating a relationship between a user node representing the user and an item node representing an item of the two or more items with more recent date and time when an interaction occurred.

(5) In the information processing apparatus according to any one of (1) to (4), the time-series information includes information of date and time when an interaction by two or more users of the plurality of users with any one of items of the plurality of items occurred.

(6) In the information processing apparatus according to (5), the construction unit assigns a higher weight to a link indicating a relationship between an item node representing the item and a user node representing a user of the two or more users with more recent date and time when an interaction occurred.

(7) In the information processing apparatus according to any one of (1) to (6), the time-series interactions between the plurality of users and the plurality of items includes a purchase of any of the plurality of items by any one of the plurality of users.

(8) In the information processing apparatus according to any one of (1) to (7), the time-series interactions between the plurality of users and the plurality of items includes an interaction that occurred from a predetermined reference date and time to a predetermined period in the past.

(9) In the information processing apparatus according to any one of (1) to (8), the user features are factual features for each of the plurality of users.

(10) An information processing method includes: acquiring user features indicating features for each of a plurality of users and item features indicating features for each of a plurality of items; acquiring time-series information indicating time-series interactions between the plurality of users and the plurality of items; constructing, based on the user features, the item features, and the time-series information, a graph including a plurality of user nodes representing the plurality of users, a plurality of item nodes representing the plurality of items, and links indicating interaction relationships in the plurality of user nodes and the plurality of item nodes; and extracting, from the graph, a node representation in the graph for any node among the plurality of user nodes and the plurality of item nodes.

(11) An information processing program for causing a computer to execute information processing, the program causes the computer to execute: feature acquisition processing for acquiring user features indicating features for each of a plurality of users and item features indicating features for each of a plurality of items; time-series information acquisition processing for acquiring time-series information indicating time-series interactions between the plurality of users and the plurality of items; construction processing for constructing, based on the user features, the item features, and the time-series information, a graph including a plurality of user nodes representing the plurality of users, a plurality of item nodes representing the plurality of items, and links indicating interaction relationships in the plurality of user nodes and the plurality of item nodes; and extraction processing for extracting, from the graph, a node representation in the graph for any node among the plurality of user nodes and the plurality of item nodes.

What is claimed is:

1. An information processing apparatus comprising:
at least one memory configured to store computer program code; and
one or more processors configured to operate according to the computer program code, the computer program code comprising:
feature acquisition code configured to cause the one or more processors to acquire user features indicating features for each of a plurality of users and item features indicating features for each of a plurality of items;
time-series information acquisition code configured to cause the one or more processors to acquire time-series information indicating time-series interactions between the plurality of users and the plurality of items;
construction code configured to cause the one or more processors to construct, based on the user features, the item features, and the time-series information, a graph including a plurality of user nodes representing the plurality of users, a plurality of item nodes representing the plurality of items, and links indicating interaction relationships in the plurality of user nodes and the plurality of item nodes,
wherein the construction code is further configured to cause the one or more processors to construct the graph as a knowledge graph comprising a user relationship graph including links between user nodes, an item relationship graph including links between item nodes, and a user-item relationship graph including links between the user nodes and the item nodes,
wherein the construction code is further configured to cause the one or more processors to connect the user relationship graph, the item relationship graph, and the user-item relationship graph using nodes that are common between the graphs as connection points; and
extraction code configured to cause the one or more processors to extract, from the graph, a user node representation in the graph for any user node among the plurality of user nodes,
wherein the user node representation includes a unified user representation of a user identified by the user node, the user representation representing all users and items that are related to the user from the knowledge graph.

2. The information processing apparatus according to claim 1, wherein the construction code is further configured to cause the one or more processors to weights the links based on the time-series information.

3. The information processing apparatus according to claim 1, wherein the time-series information includes information of date and time when an interaction by any one of the plurality of users with each of two or more items of the plurality of items occurred.

4. The information processing apparatus according to claim 3, wherein the construction code is further configured to cause the one or more processors to assigns a higher weight to a link indicating a relationship between a user node representing the user and an item node representing an item of the two or more items with more recent date and time when an interaction occurred.

5. The information processing apparatus according to claim 1, wherein the time-series information includes information of date and time when an interaction by two or more users of the plurality of users with any one of items of the plurality of items occurred.

6. The information processing apparatus according to claim 5, wherein the construction code is further configured to cause the one or more processors to assign a higher weight to a link indicating a relationship between an item node representing the item and a user node representing a user of the two or more users with more recent date and time when an interaction occurred.

7. The information processing apparatus according to claim 1, wherein the time-series interactions between the plurality of users and the plurality of items includes a purchase of any of the plurality of items by any one of the plurality of users.

8. The information processing apparatus according to claim 1, wherein the time-series interactions between the plurality of users and the plurality of items includes an interaction that occurred from a predetermined reference date and time to a predetermined period in the past.

9. The information processing apparatus according to claim 1, wherein the user features are factual features for each of the plurality of users.

10. The information processing apparatus according to claim 1,
wherein the any node is any user node of the plurality of user nodes, and the extraction code is configured to cause the one or more processors to extract, as the node representation, a user representation representing relationships of the any user node with the plurality of user nodes and the plurality of item nodes,
wherein, in the user representation, pieces of information regarding one or more users, items, genres, and shops that are connected to a first user by implicit and explicit links are reflected in the user representation,
wherein a node representation includes representation of an item or of a genre,
wherein closeness scores of nodes connected to the first user are included in the user representation, and
wherein the user representation of the first user includes a closeness score with respect to a neighboring representation.

11. The information processing apparatus according to claim 1,
wherein the construction unit performs streamlining by deleting duplicate links when connecting the user relationship graph, the item relationship graph, and the user-item relationship graph.

12. An information processing method comprising:
acquiring user features indicating features for each of a plurality of users and item features indicating features for each of a plurality of items;
acquiring time-series information indicating time-series interactions between the plurality of users and the plurality of items;
constructing, based on the user features, the item features, and the time-series information, a graph including a plurality of user nodes representing the plurality of users, a plurality of item nodes representing the plurality of items, and links indicating interaction relationships in the plurality of user nodes and the plurality of item nodes;
constructing the graph as a knowledge graph comprising a user relationship graph including links between user nodes, an item relationship graph including links between item nodes, and a user-item relationship graph including links between the user nodes and the item nodes;
connecting the user relationship graph, the item relationship graph, and the user-item relationship graph using nodes that are common between the graphs as connection points;
extracting, from the graph, a user node representation in the graph for any user node among the plurality of user nodes and the plurality of item nodes; and
wherein the user node representation includes a unified user representation of a user identified by the user node, the user representation representing all users and items that are related to the user from the knowledge graph.

13. A non-transitory computer readable medium storing a computer program that when executed by at least one processor, causes the at least one processor to:
acquire user features indicating features for each of a plurality of users and item features indicating features for each of a plurality of items;
acquire time-series information indicating time-series interactions between the plurality of users and the plurality of items;
construct, based on the user features, the item features, and the time-series information, a graph including a plurality of user nodes representing the plurality of users, a plurality of item nodes representing the plurality of items, and links indicating interaction relationships in the plurality of user nodes and the plurality of item nodes;
construct the graph as a knowledge graph comprising a user relationship graph including links between user nodes, an item relationship graph including links between item nodes, and a user-item relationship graph including links between the user nodes and the item nodes;
connect the user relationship graph, the item relationship graph, and the user-item relationship graph using nodes that are common between the graphs as connection points;
extract, from the graph, a user node representation in the graph for any user node among the plurality of user nodes and the plurality of item nodes; and
wherein the user node representation includes a unified user representation of a user identified by the user node, the user representation representing all users and items that are related to the user from the knowledge graph.

* * * * *